(12) United States Patent
Spicer et al.

(10) Patent No.: US 7,412,330 B2
(45) Date of Patent: Aug. 12, 2008

(54) SENSOR SYSTEM, METHOD, AND COMPUTER PROGRAM PRODUCT FOR PLANT PHENOTYPE MEASUREMENT IN AGRICULTURAL ENVIRONMENTS

(75) Inventors: Mark W. Spicer, Ankeny, IA (US);
Arno Ruckelshausen, Osnabrück (DE);
Timur M. Dzinaj, Osnabrück (DE);
Andreas Linz, Osnabrck (DE)

(73) Assignee: Pioneer Hi-Bred International, Inc., Johnston, IA (US)

( * ) Notice: Subject to any disclaimer, the term of this patent is extended or adjusted under 35 U.S.C. 154(b) by 119 days.

(21) Appl. No.: 11/461,212

(22) Filed: Jul. 31, 2006

(65) Prior Publication Data

US 2007/0044445 A1  Mar. 1, 2007

Related U.S. Application Data

(60) Provisional application No. 60/704,412, filed on Aug. 1, 2005.

(51) Int. Cl.
*A01D 34/00* (2006.01)
(52) U.S. Cl. ........................................... 702/2
(58) Field of Classification Search .................. 702/2, 702/5; 701/50
See application file for complete search history.

(56) References Cited

U.S. PATENT DOCUMENTS

| | | | |
|---|---|---|---|
| 5,793,035 A * | 8/1998 | Beck et al. | 250/222.1 |
| 5,837,997 A * | 11/1998 | Beck et al. | 250/227.11 |
| 6,199,000 B1 * | 3/2001 | Keller et al. | 701/50 |
| 6,327,569 B1 * | 12/2001 | Reep | 705/1 |
| 6,937,939 B1 * | 8/2005 | Shibusawa et al. | 702/22 |
| 6,963,881 B2 * | 11/2005 | Pickett et al. | 707/104.1 |
| 6,999,877 B1 * | 2/2006 | Dyer et al. | 702/5 |
| 7,047,133 B1 * | 5/2006 | Dyer et al. | 702/5 |
| 2001/0036295 A1 * | 11/2001 | Hendrickson et al. | 382/110 |

FOREIGN PATENT DOCUMENTS

| DE | 4220913 C2 | 1/1994 |
|---|---|---|
| JP | 2002-101770 A | 4/2002 |
| JP | 2000-293287 A | 9/2002 |

* cited by examiner

*Primary Examiner*—Donald E McElheny, Jr.
(74) *Attorney, Agent, or Firm*—Alston & Bird LLP

(57) ABSTRACT

A sensor system, method, and computer program product for determining physical characteristics of individual plants within a row located in an agricultural environment is provided. Embodiments of the present invention include, but are not limited to, a sensor assembly including a plurality of emitters and a corresponding plurality of receivers disposed substantially opposite one another such that the receivers may receive a plurality of signals emitted by said emitters to generate a binary profile image of each plant within a row of plants positioned along a row axis. Embodiments of the present invention also include supplementary sensors for determining other plant characteristics including leaf pattern and plant location along the row axis. The method and computer program product embodiments of the present invention may also differentiate selected plants of interest from invasive or weed species using the outputs of the sensor device of the present invention.

44 Claims, 16 Drawing Sheets

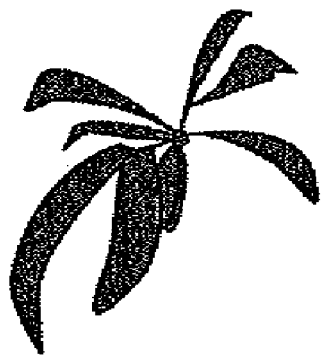
Fig. 7A
Fig. 7B

SENSOR SYSTEM, METHOD, AND COMPUTER PROGRAM PRODUCT FOR PLANT PHENOTYPE MEASUREMENT IN AGRICULTURAL ENVIRONMENTS

CROSS-REFERENCE TO RELATED APPLICATION

This application claims the benefit of U.S. Provisional Application No. 60/704,412, filed Aug. 1, 2005, which is hereby incorporated herein in its entirety by reference.

FIELD OF THE INVENTION

The present invention relates generally to sensor devices adapted to detect and measure plant characteristics and dimensions in an agricultural environment. More particularly the sensor device, method, and computer program product of the present invention allows for the real-time measurement of plant characteristics including, but not limited to: plant profile, leaf size, leaf configuration, height, stem configuration, spectral signature, and other characteristics that may be used to identify a plant of interest and/or indicate the viability or physiological state of a particular plant of interest. Embodiments of the present invention may also allow for the accurate identification of selected plant varieties of interest in an agricultural environment such that weeds, soil, dust, and/or invasive plant species may be accurately differentiated from the selected plants of interest.

BACKGROUND OF THE INVENTION

Farmers and agricultural researchers have, for many years, developed various tools, devices, and methods for identifying and controlling native weeds, invasive plant species, and/or other plants that may interfere or hinder the growth or harvest of a crop (such as maize) in an agricultural plot. There has also been interest in accurately measuring and tracking the expression of genetics as physical traits (or phenotypes) of plants that have been bred for uniformity, yield, increased biomass, and other quantifiable physical traits. The accurate measurement and/or identification of plant phenotypes in an agricultural environment is crucial for providing the foundation for new agricultural methods such as, for example, automated weed control, the tracking of genotype expression in vivo and other automated agricultural techniques.

Furthermore, some research has been directed towards controlling weeds using automated physical means without the use of chemicals and/or herbicidal agents. However, such automated physical means for controlling weeds require the accurate identification and classification of crop plants and of weed plants that should be targeted by the weed control activity. Some sensor systems have been proposed for imaging useful plant species using spectral cameras either alone or in combination with geometric signatures obtained from alternate camera devices. Other proposed systems utilize high-resolution 3-D cameras to image plants in the field. However, these solutions are not practical due to the lack of market availability for high-resolution and reliable camera systems that may stand up to the rigors of use in a working agricultural environment. Industrial light curtains have been developed and used extensively in industrial environments, providing arrays of emitters for emitting light beams towards corresponding receiver elements that surround industrial equipment that may be hazardous while running. In use, these systems automatically shut off power to the industrial equipment for safety when the light beams are broken by an intervening object. While such light curtains are durable and might be suited for collecting lateral plant profile and height information, they have not yet been successfully utilized in conjunction with a computer device for generating imagery and complex plant characteristic data sets for identifying and classifying crop plants such as maize. Furthermore, light curtain technology has not been successfully integrated with spectral imaging technology to form a durable and reliable sensor assembly with a computer device capable of providing a plant characteristic data set having sufficient detail and accuracy for identifying plants of interest and differentiating such plants of interest from native weeds or other plants. Furthermore, plant characteristic data from redundant data sources (such as multiple light curtains and supplementary cameras, distance sensors, location sensors) has not been collected in a working agricultural environment and integrated to allow for the automated detection, identification, and cataloging of plants of interest, such as maize plants being cultivated in a field.

Thus in order to facilitate an economical, reliable, and accurate system for automating the collection of phenotypic plant data for research purposes and/or for crop vs. weed differentiation, there is a need in the art for a sensor system, method, and computer program product that allows for the collection of plant characteristic (phenotypic) data from a number of sensors and/or measurement devices and a system that effectively integrates such data into a comprehensive plant characteristic data set. Furthermore, there exists a need for a sensor assembly that is reliably operable in a variety of agricultural environments that may be obscured by dust, moisture, bright sunlight, subject to extreme temperatures. Furthermore, there exists a need in the art for a sensor assembly with a high-throughput capability that is capable of scanning a large number of plants as the assembly is advanced along a row of plants being cultivated in an agricultural environment. There further exists a need for a system and/or method for scanning plants that may be cultivated in a greenhouse and/or laboratory operation in pots, trays, or other containers that may be conveyed to and from scanning sensors fixed in a static position.

SUMMARY OF THE INVENTION

The embodiments of the present invention satisfy the needs listed above and provide other advantages as described below. Embodiments of the present invention may include a system for measuring physical characteristics of plants within a row or planted in some linear fashion, wherein each plant in the row defines a stem axis extending substantially vertically from the row axis in an agricultural environment. In some embodiments, the system comprises a sensor assembly including a plurality of emitters and a plurality of receivers disposed substantially opposite and parallel to the emitters for receiving a plurality of signals such that the receivers and corresponding emitters may be positioned on opposite sides of the row, and a computer device in communication with said sensor assembly for controlling the emission and/or reception of signals by the emitters and/or receivers, respectively. Furthermore, according to some embodiments, the emitters emit signals such that a portion of a plant in the row obscures at least a portion of a plurality of signals and the computer device receives a plant profile data set generated by the receivers. The emitters may, in some embodiments, passively emit signals or, in other embodiments, be controlled by the computer device to emit the signals. The plant profile data set may comprise a plurality of positive data points corresponding to an uninterrupted, received signal and a plurality of negative data points corresponding to the portion of the plurality of signals obscured and/or broken by the plant. Furthermore, according to some system embodiments, the computer device generates a plant characteristic data set containing plant characteristic data based at least in part on the plant profile data received from the receivers such that the plant characteristic data set may be used to: measure the physical characteristics of the plants within the row; count a number of a plurality of plants within the row; and/or determine a density and/or frequency of a particular plant of interest within a given cultivation area or row.

According to some embodiments, the sensor assembly of the present invention further comprises at least one of: an industrial light curtain, a plurality of photodiodes substantially aligned with a corresponding plurality of optical sensors, and combinations thereof. Furthermore, the system of the present invention may further comprise a wheeled carriage or other carrier device for advancing the sensor assembly along the row, such that the computer device may further control the emitters to repeatedly emit the signals at a selected rate to generate a two-dimensional profile of the plant by compiling plant profile data generated by said receivers at a plurality of longitudinal points along the row axis. In addition, various system embodiments of the present invention may comprise other components for generating physical plant data that may be added to the plant characteristic data set by the computer device. For example, system embodiments of the present invention may further comprise components including, but not limited to: distance sensors for locating plant stem location and plant height; multi-spectral sensors or imaging systems such as a multi-spectral device, spectrograph, and/or spectrometer for capturing multi-spectral plant images; a shaft encoder operably engaged with a carriage wheel axle for transmitting plant position and sensor position data within a row location to the computer device; and a global positioning system device for determining a geographical position of the plant.

According to some embodiments of the system of the present invention, the system further comprises a memory device in communication with the computer device for storing the plant characteristic data set of a known plant of interest. Thus, in some system embodiments, the computer device may further identify and count the plant by comparing the generated plant characteristic data set with the stored plant characteristic data set of the known plant of interest.

The embodiments of the present invention also provide a method and computer program product for measuring physical characteristics of and/or counting each plant positioned within a row, defining, in some cases, a row axis wherein each plant in the row defining a stem axis extending substantially vertically from the row axis in an agricultural environment. According to some embodiments, the method first comprises providing a sensor assembly including a plurality of emitters and a corresponding plurality of receivers disposed substantially opposite the emitters for receiving a plurality of signals emitted thereby and a computer device in communication with said profile sensor assembly. The method and/or computer program product embodiments of the present invention may also comprise positioning the sensor assembly relative to the row of plants such that the receivers and emitters are positioned on opposite sides of the row, emitting the plurality of signals from such that a portion of a plant in the row obscures at least a portion of the signals, and receiving a portion of the plurality of signals at the receivers such that the receivers generate a plant profile data set comprising a plurality of positive data points corresponding to a received signal and a plurality of negative data points corresponding to the signals obscured by the portion of the plant. Finally, the method and/or computer program product embodiments of the present invention may also comprise generating a plant characteristic data set containing plant characteristic data based at least in part on the plant profile data received from the receivers such that the plant characteristic data set may be used to measure the physical characteristics of the plants.

Some method and computer program product embodiments of the present invention further comprise advancing the sensor assembly along the row axis, wherein the emitting step further comprises repeatedly emitting the signals at a selected rate, and wherein the generating step further comprises generating a two-dimensional profile of the plant by compiling the plant profile data set generated by said receivers at a plurality of longitudinal points along the row axis. The method and/or computer program product may also further comprise, in some embodiments, generating a binary image based on the plant characteristic data set, displaying the binary image to a user via a user interface, and adding the binary image to the plant characteristic data set.

The method and computer program product embodiments of the present invention may also comprise collecting a variety of plant characteristic data types to be added to the plant characteristic data set that may be stored in a memory device and used to characterize and/or count a selected plant of interest such that the computer device may thereafter use the stored plant characteristic data to identify a plant being cultivated in the agricultural environment. For example, some method and/or computer program product embodiments further comprise: locating a position of the stem axis relative to the sensor assembly using a distance sensor; capturing a multi-spectral image of the plants to differentiate the plant from a plurality of surrounding materials; transmitting a location data set from a shaft encoder (operably engaged with a wheeled carriage for advancing the sensor assembly) to determine a distance along the row of plants; and/or determining the position of the plant using a global positioning system.

Thus the various embodiments of the device, method, and computer program product of the present invention provide many advantages that may include, but are not limited to: providing sensor assembly for compiling a plant characteristic data set that may operate quickly and effectively to generate plant characteristic data in working agricultural environments, providing an agricultural sensor array comprising a plurality of relatively low-cost and durable sensors and/or imaging devices, and allowing for the storage of plant characteristic data sets that may be used to identify, count, classify, and locate plants of interest within a working agricultural environment. Some embodiments of the system, method, and computer program product of the present invention provide the added advantage of allowing selected plant types to be quickly compared with stored plant profile data for real-time identification and accurately locating plants within a commercial or research agricultural plot such that plants having selected phenotypes may be accurately mapped.

These advantages, and others that will be evident to those skilled in the art, are provided in the system, method, and computer program product of the present invention.

BRIEF DESCRIPTION OF THE DRAWINGS

Figure 1:
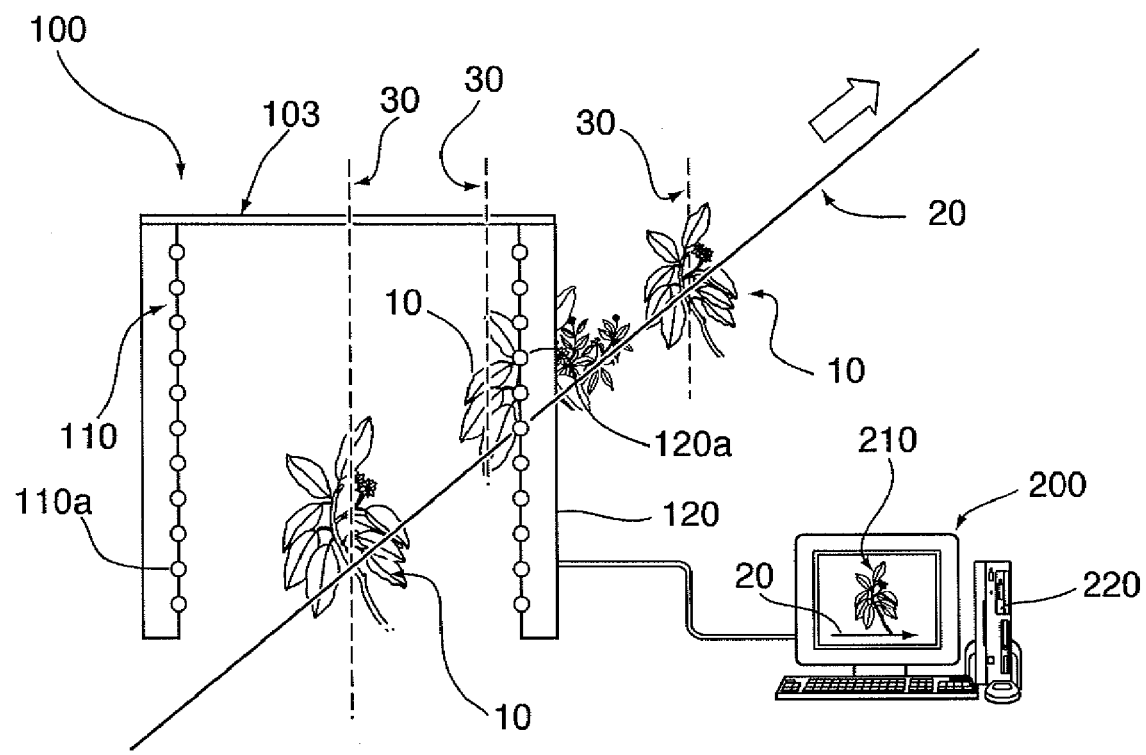
Figure 2:
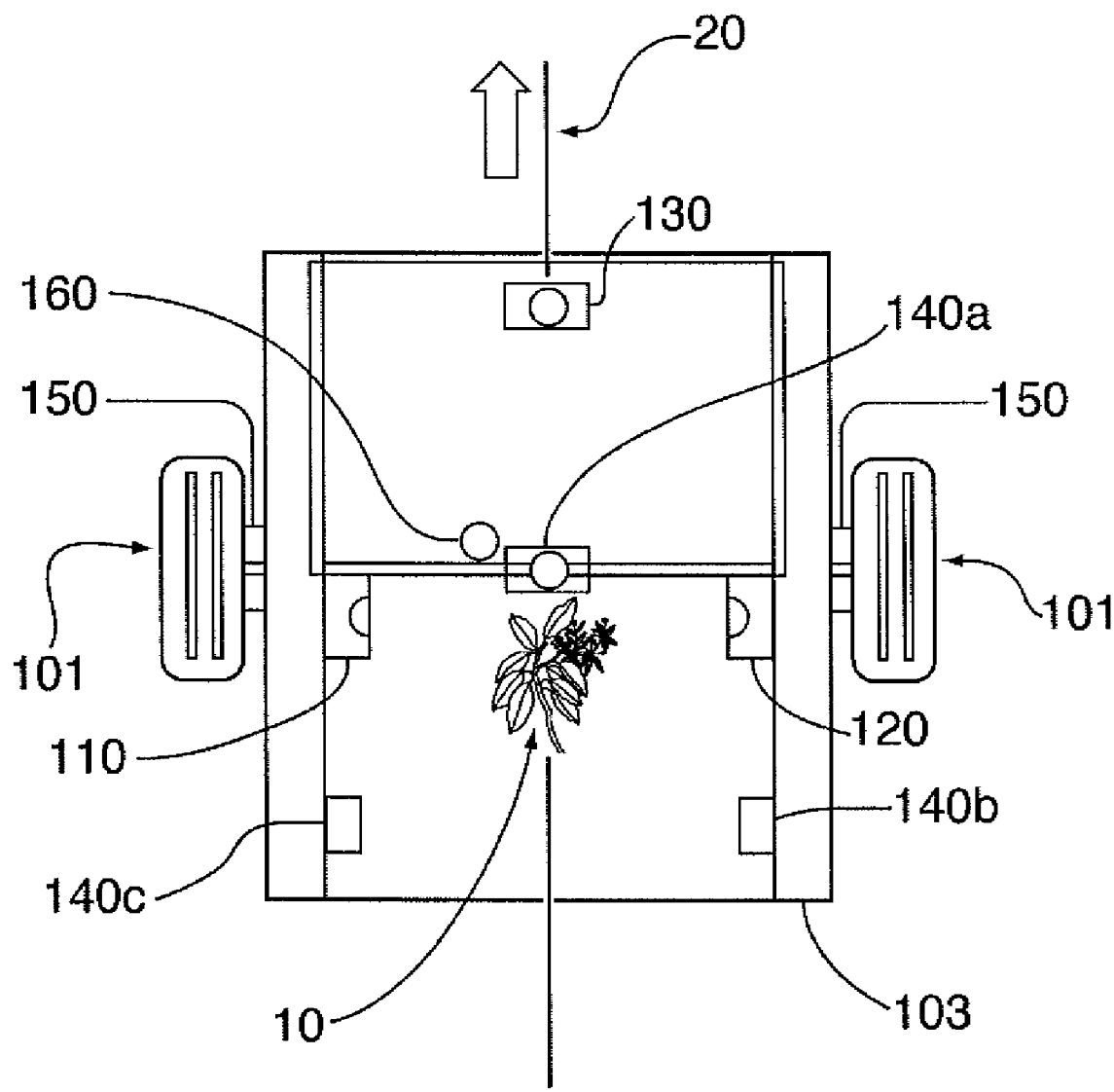
Figure 3:
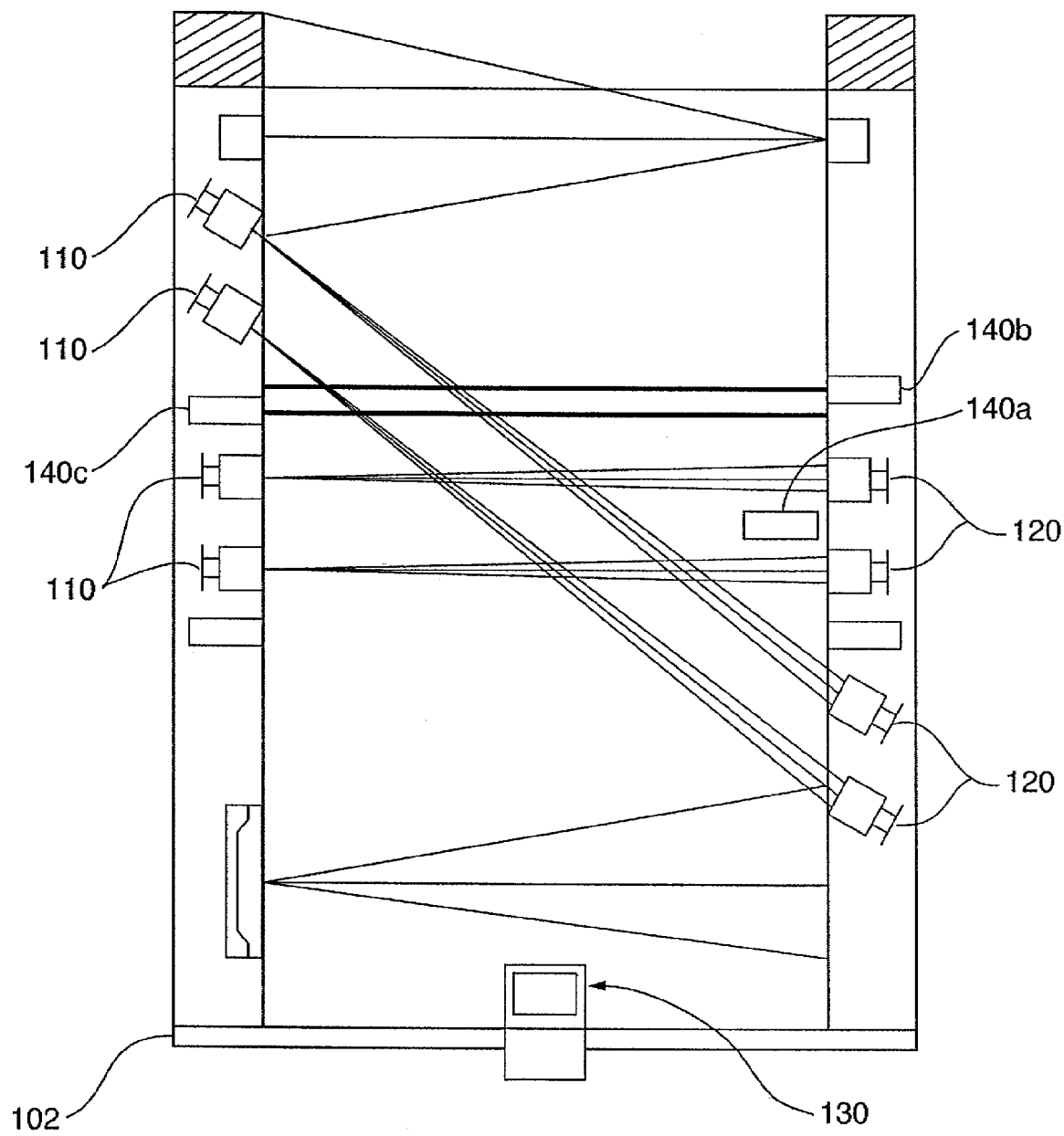
Figure 4:
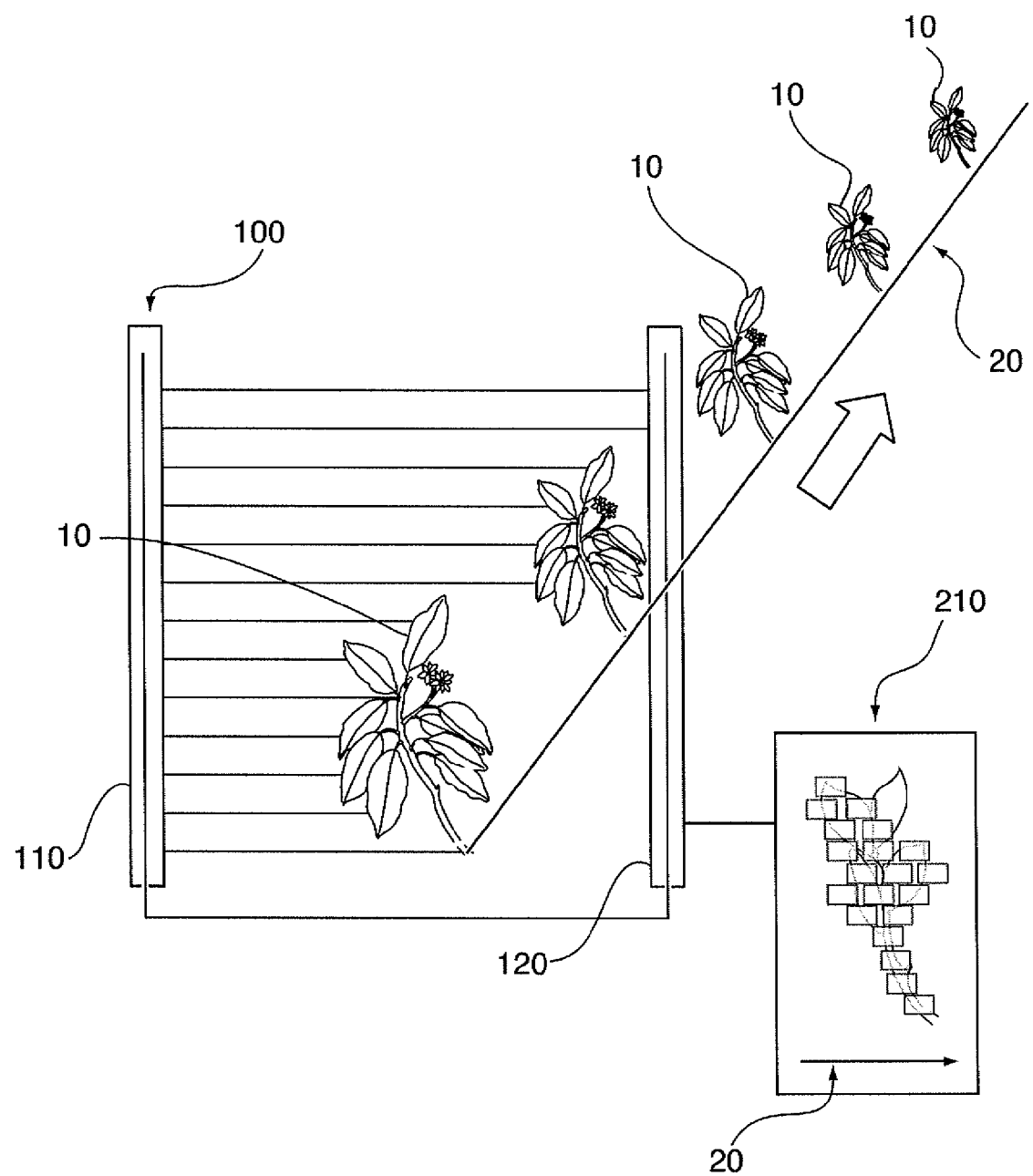
Figure 5:
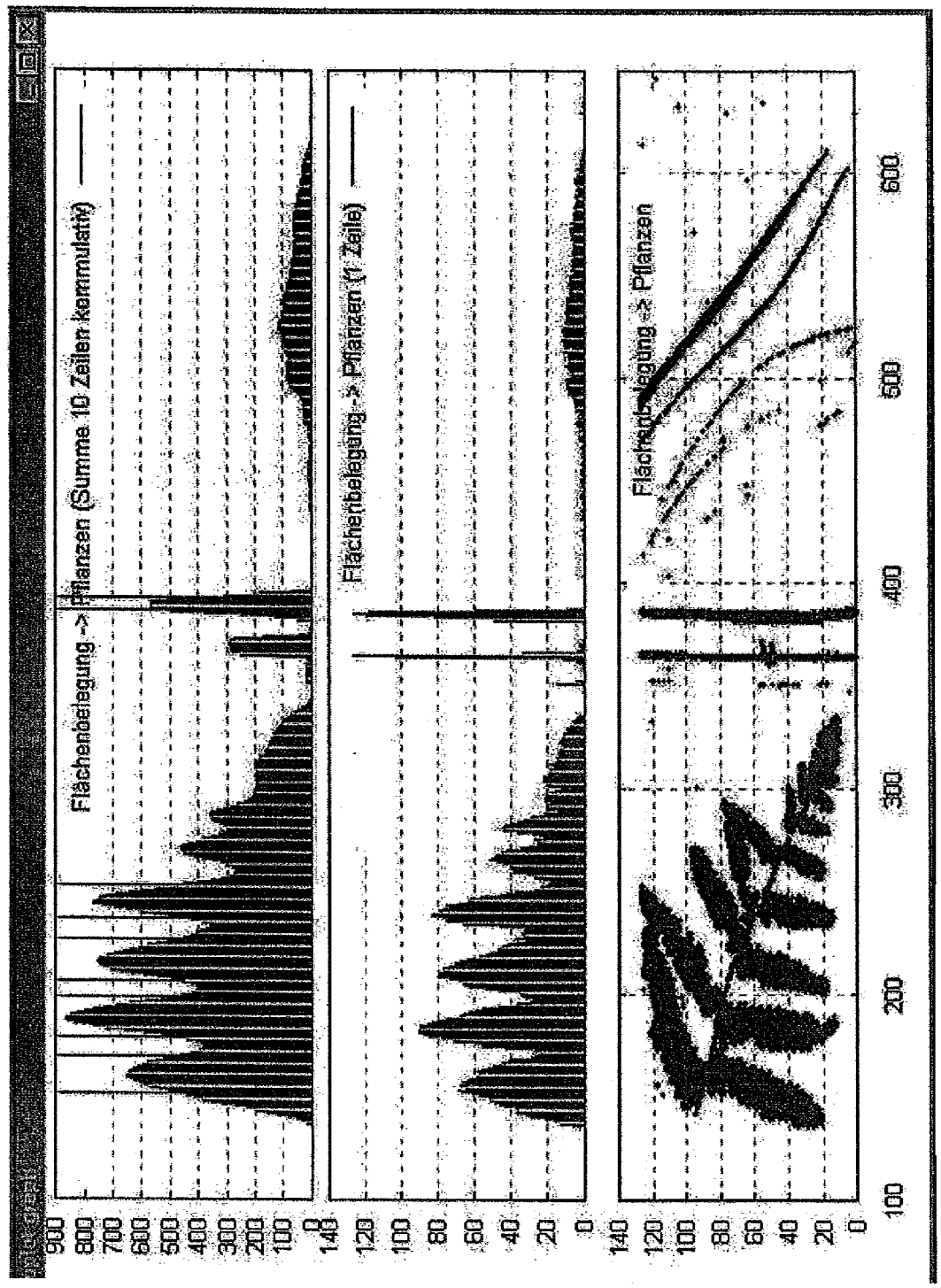
Figure 6A:
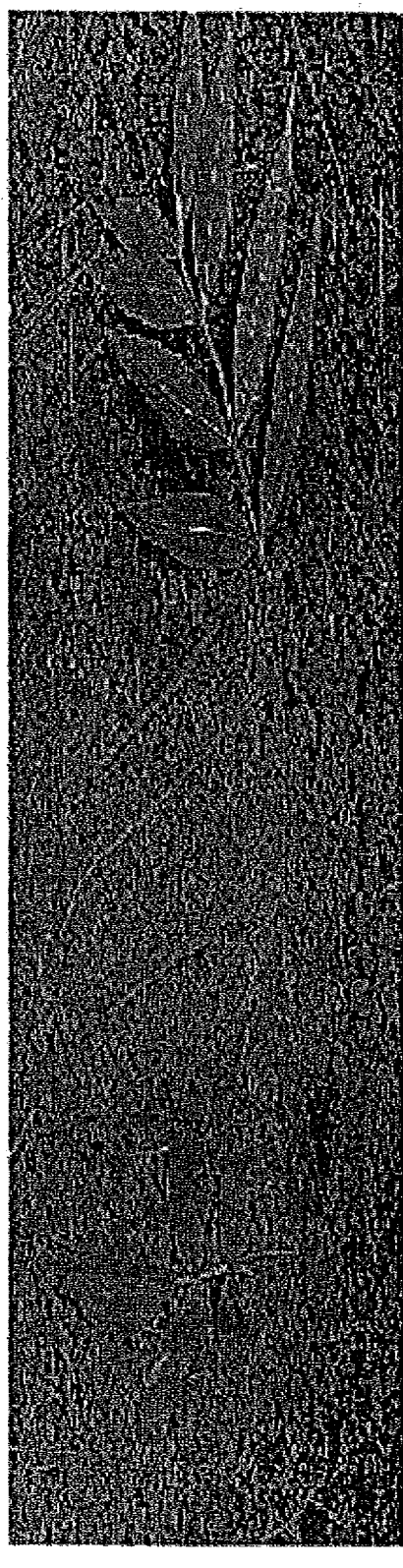
Figure 6B:
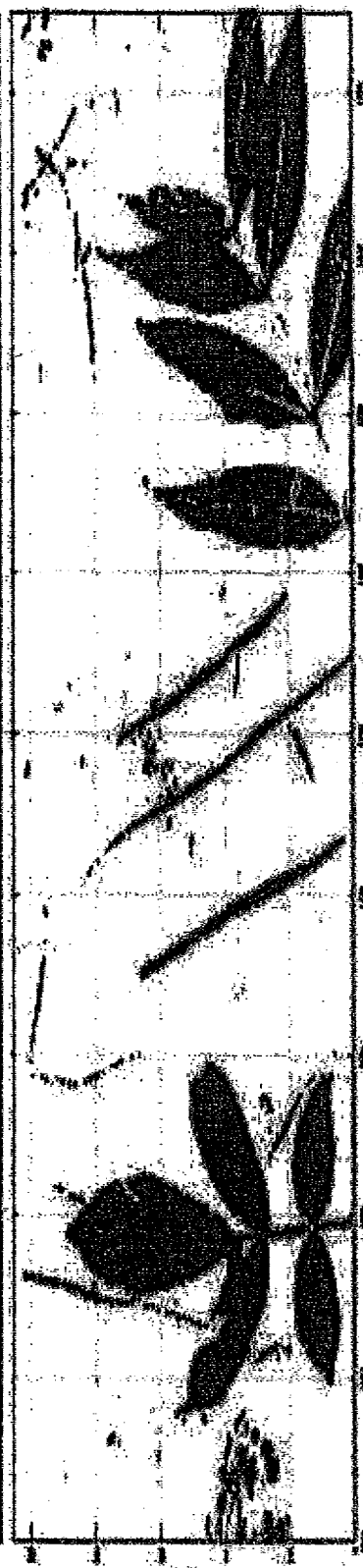
Figure 6C:
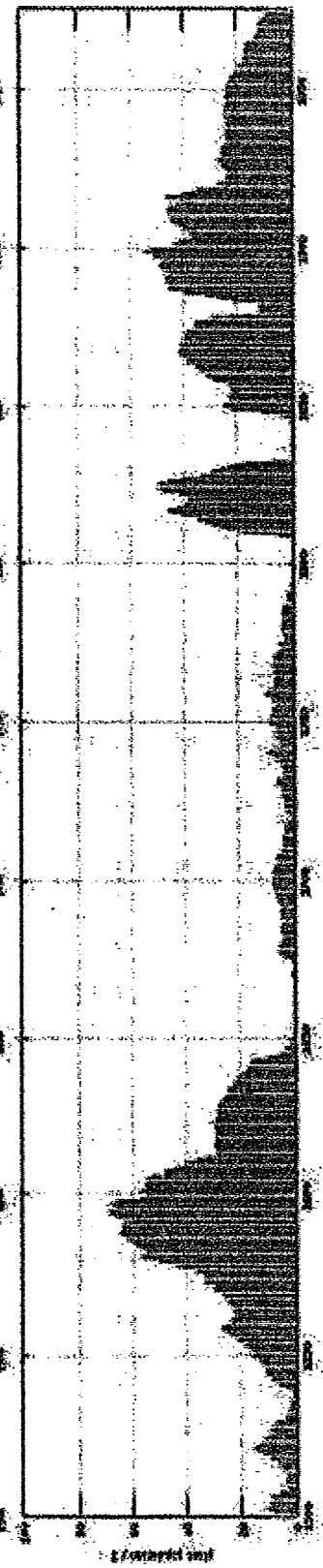
Figure 8:
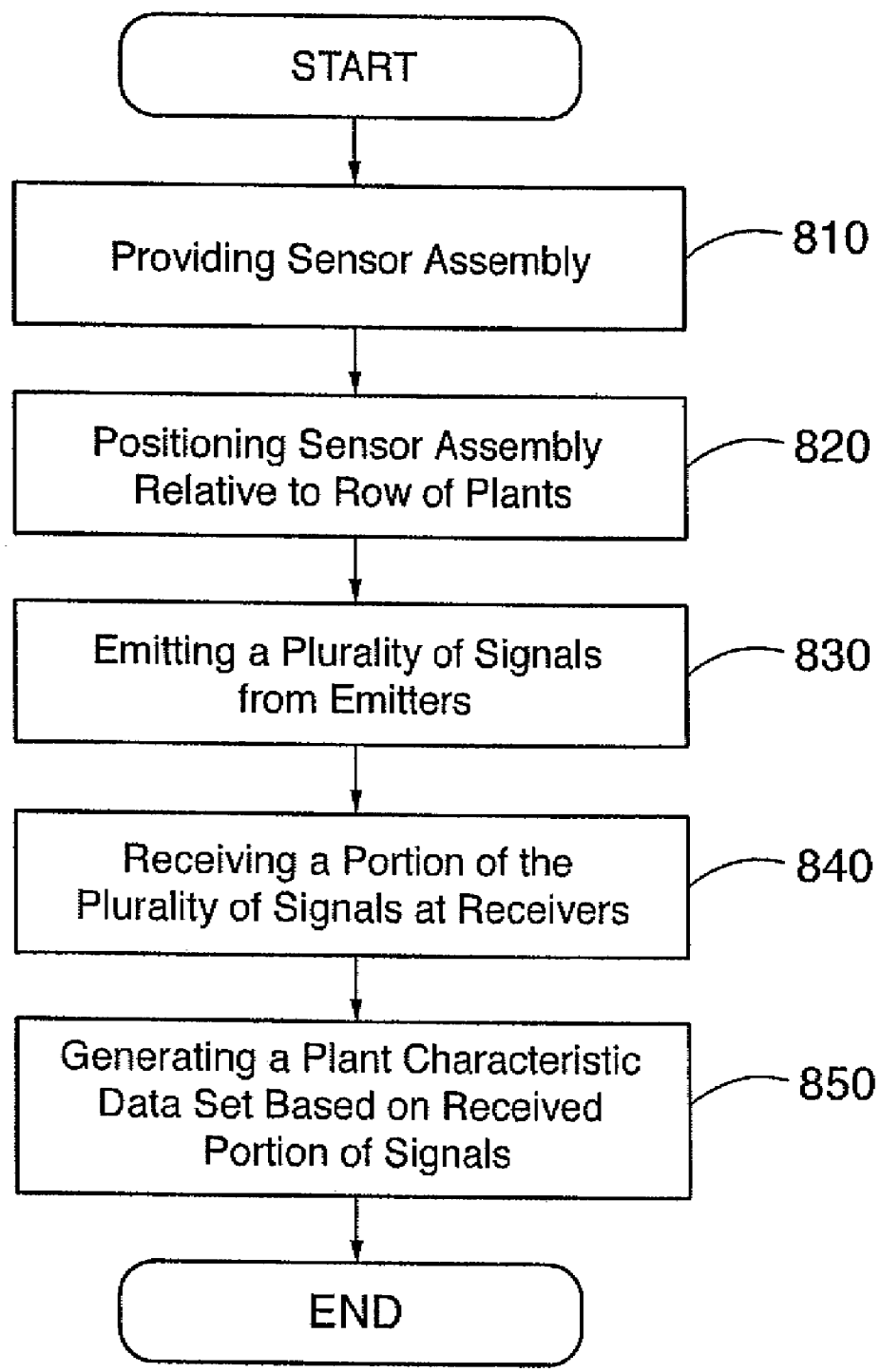
Figure 9:
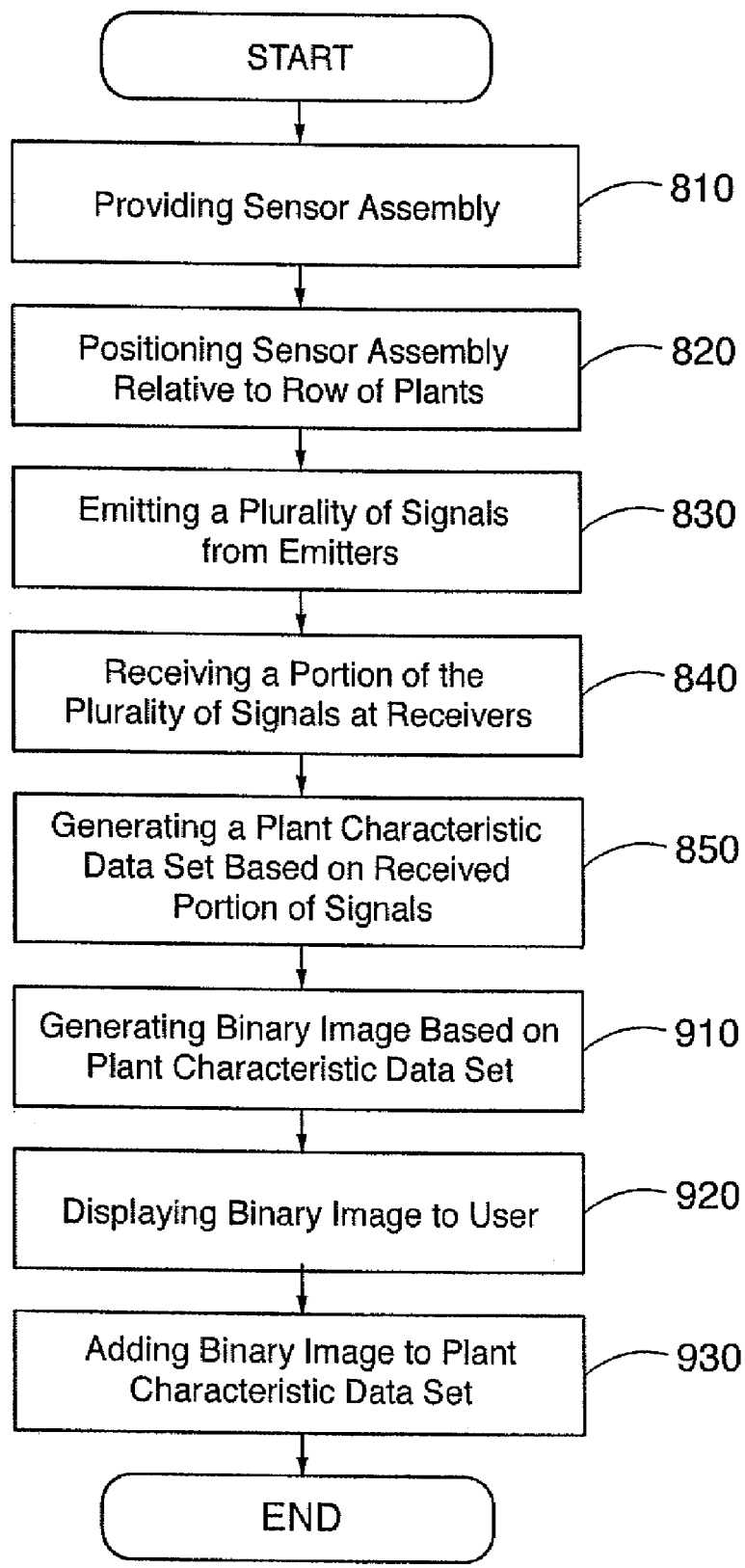
Figure 10:
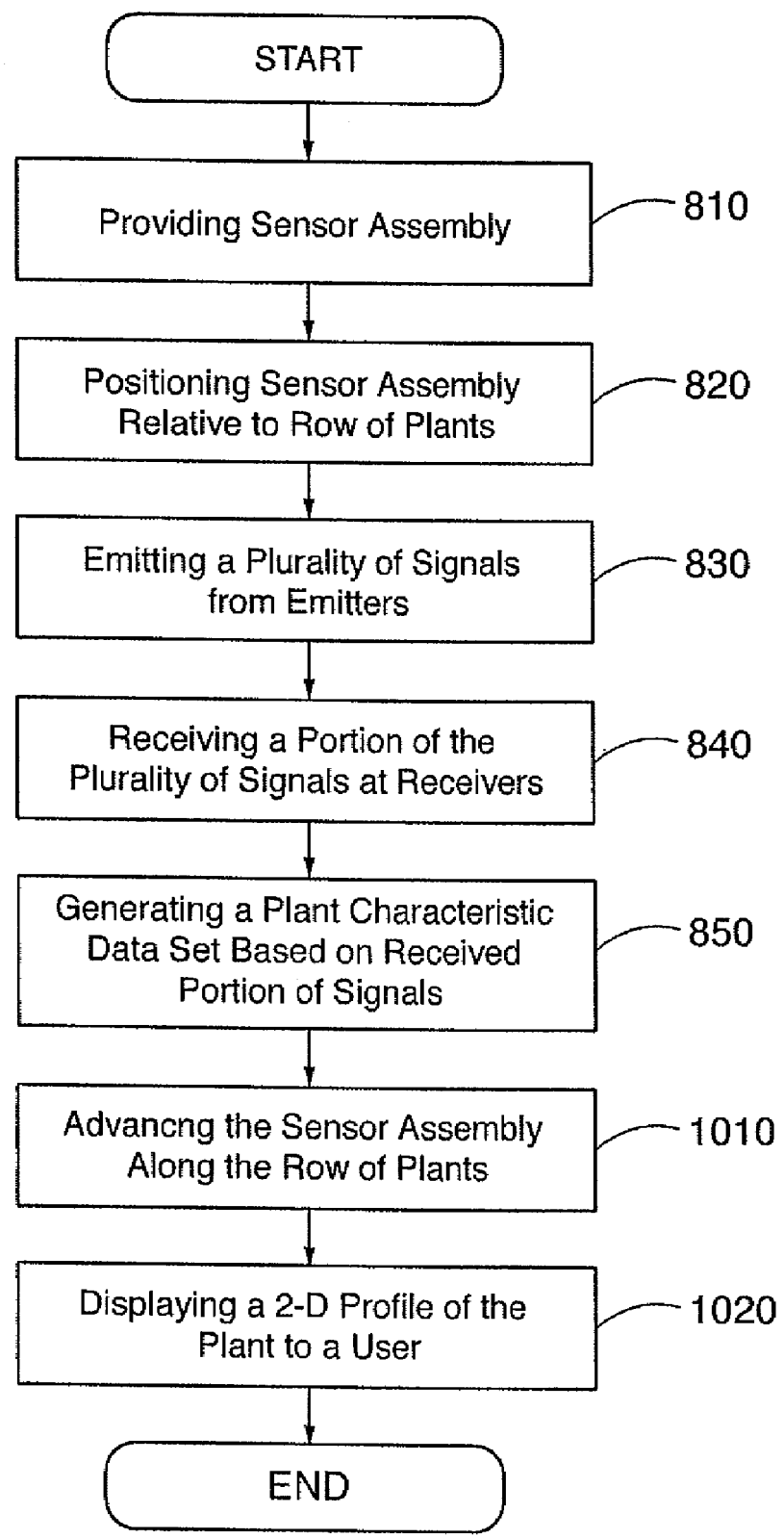
Figure 11:
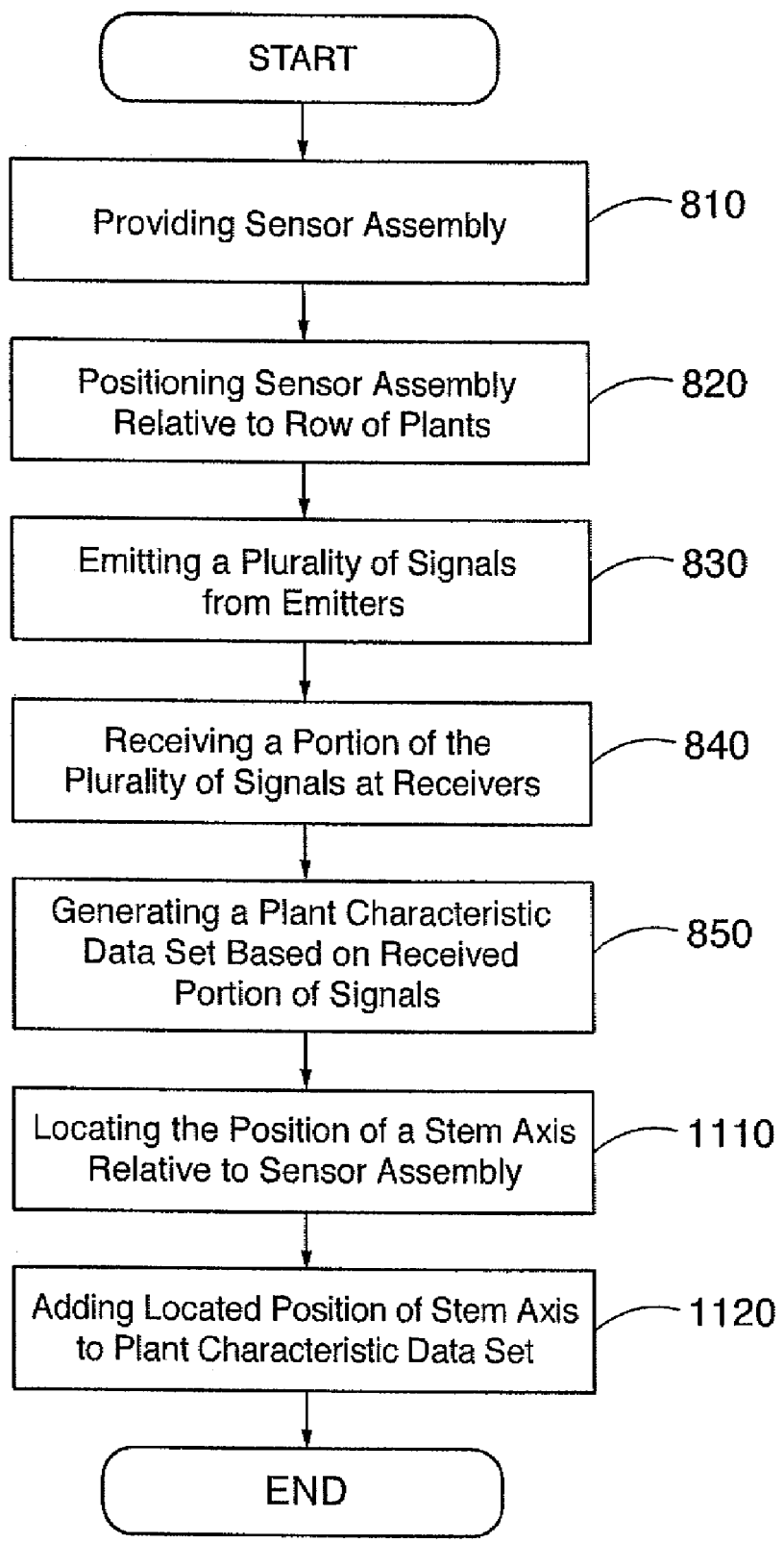
Figure 12:
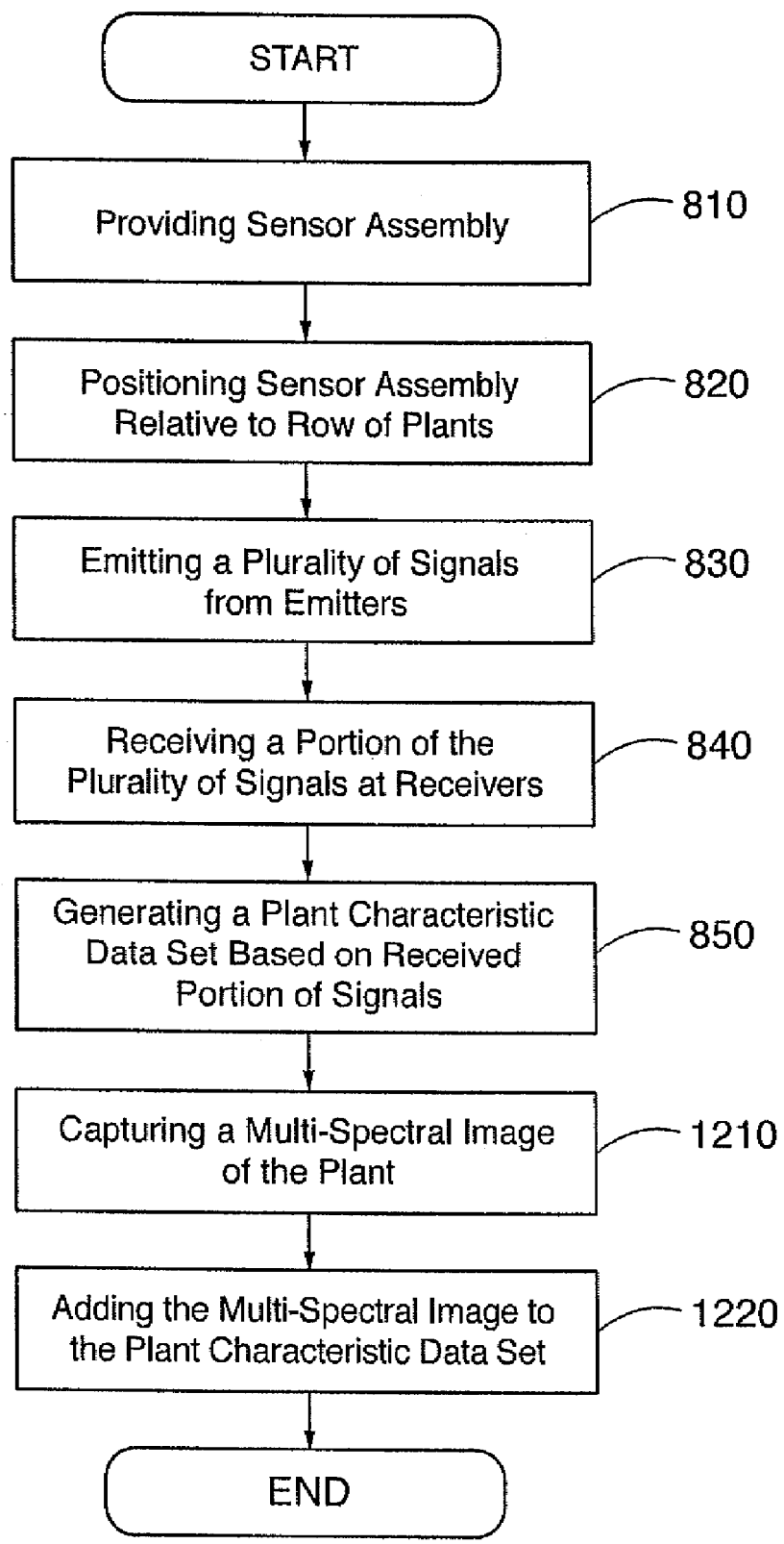
Figure 13:
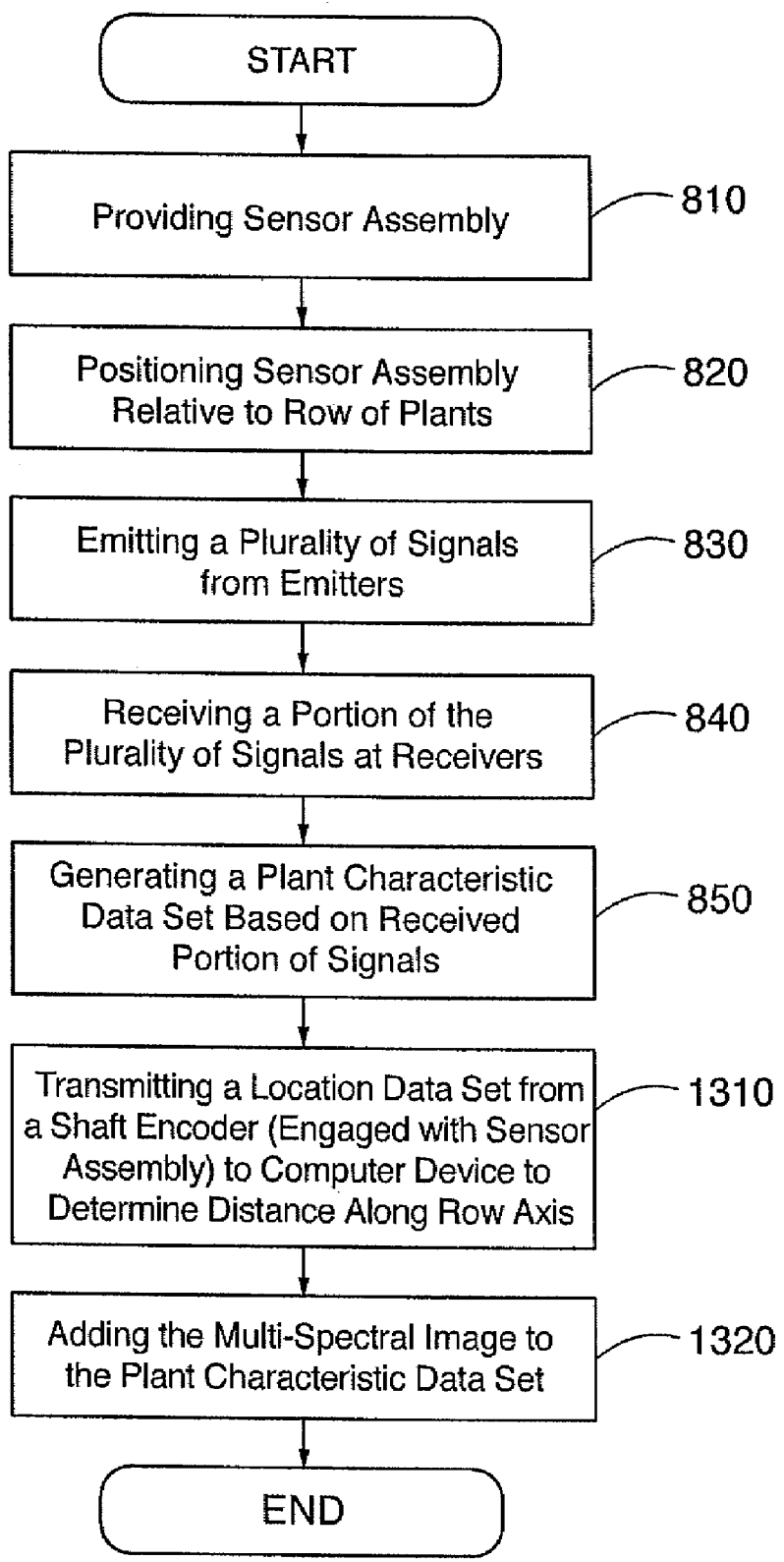
Figure 14:
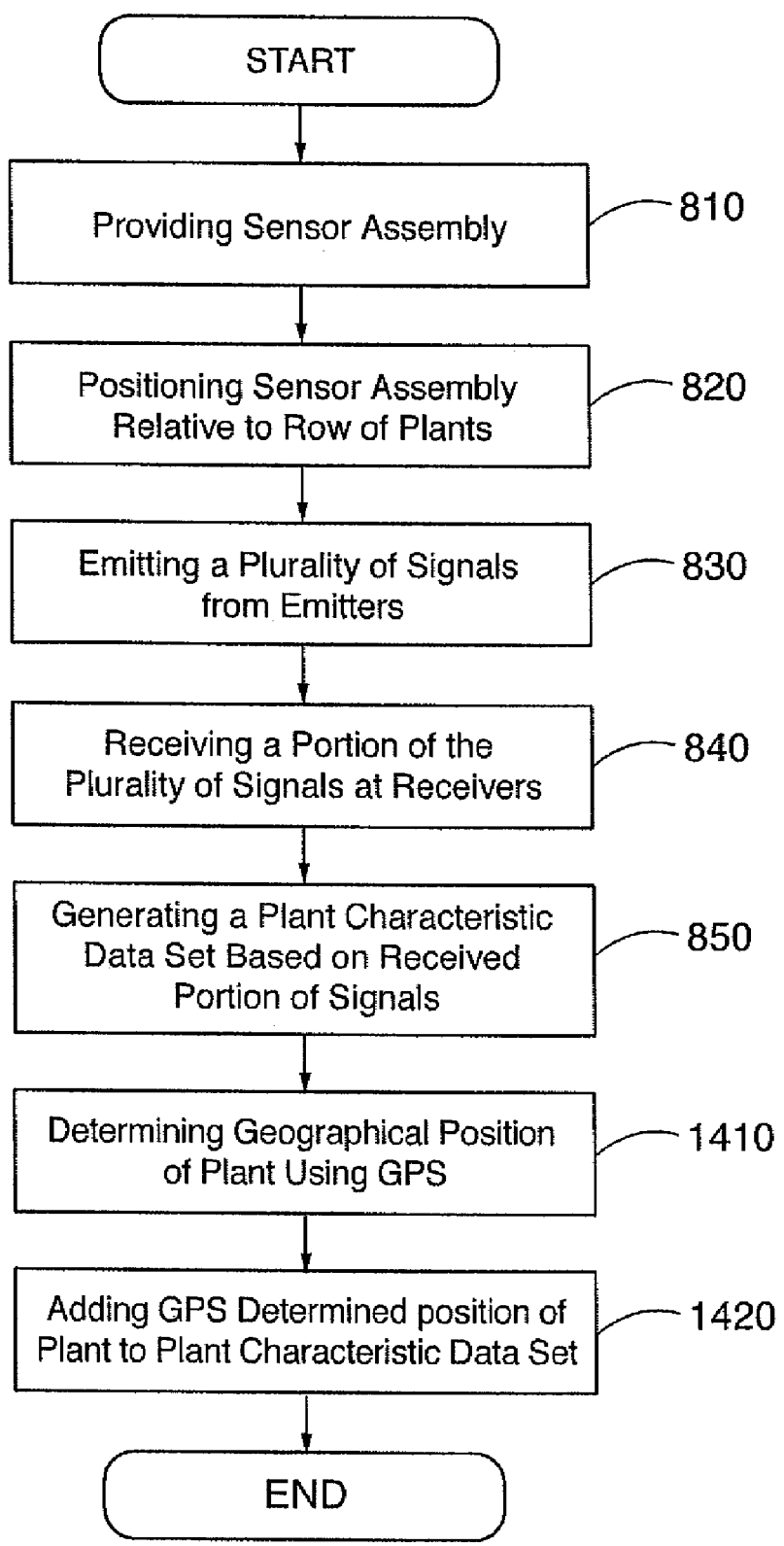
Figure 15:
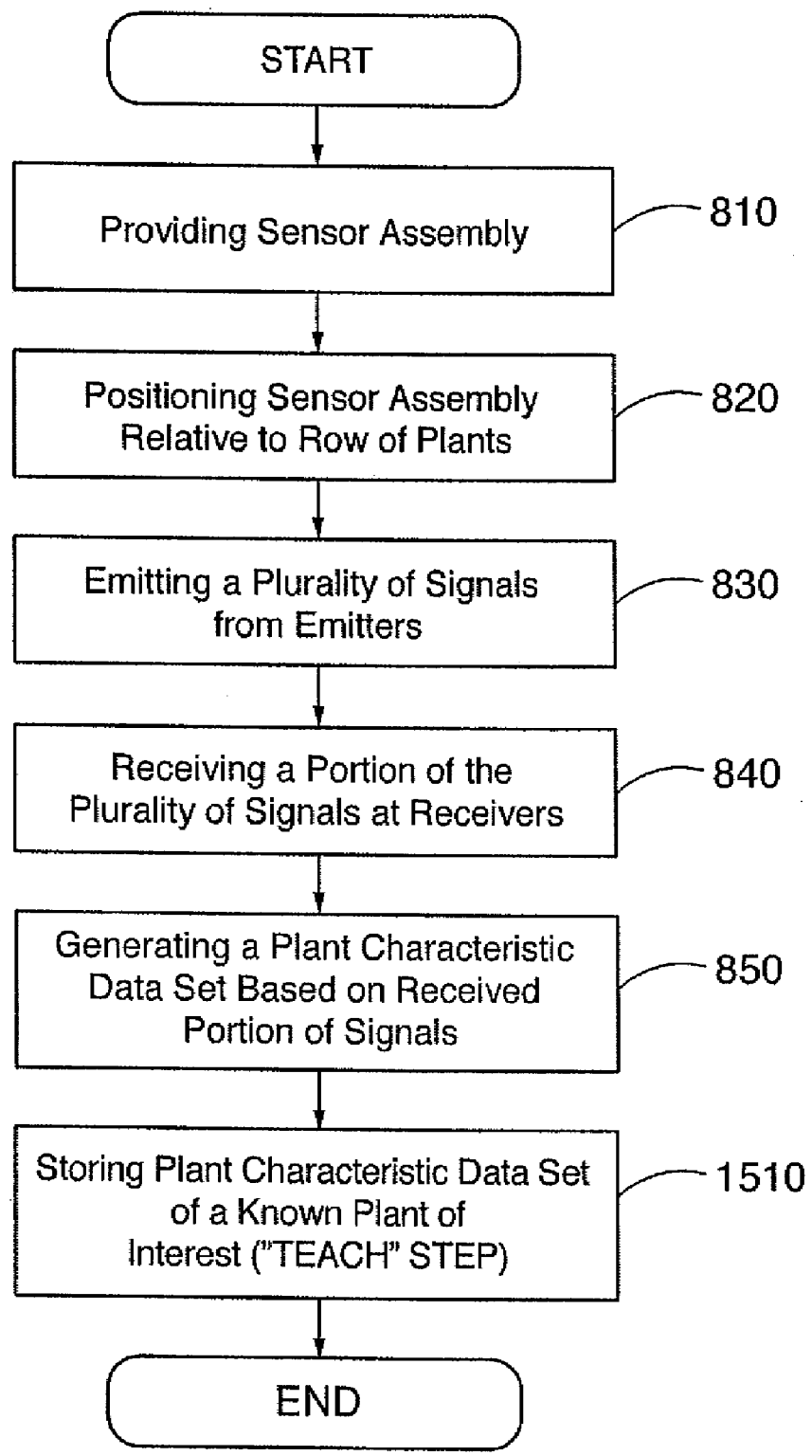
Figure 16:
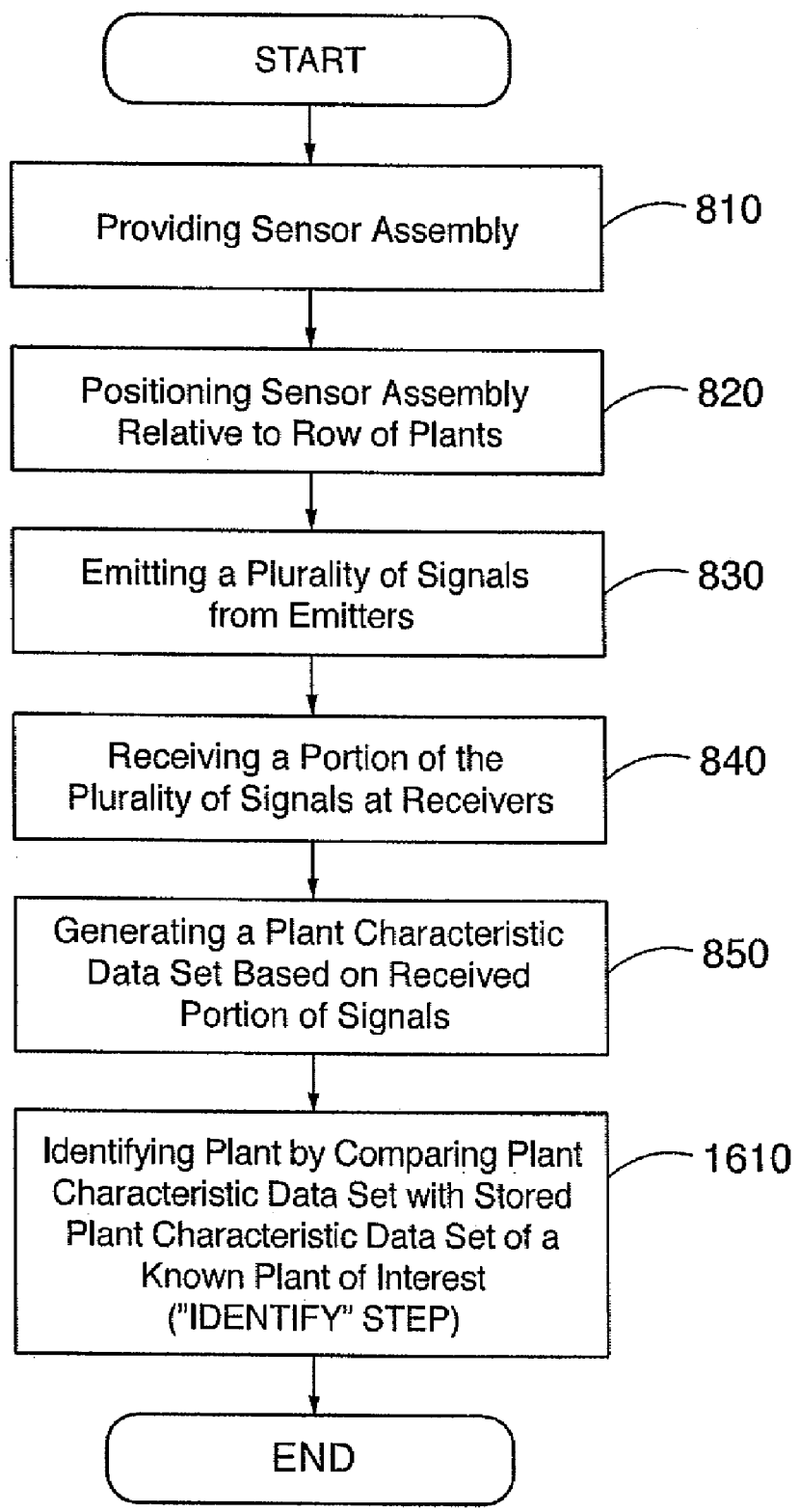

Having thus described the invention in general terms, reference will now be made to the accompanying drawings, which are not necessarily drawn to scale, and wherein:

FIG. 1 shows a perspective view of the system according to one embodiment of the present invention wherein the sensor assembly is positioned about a row of plants;

FIG. 2 shows a top view of the sensor assembly positioned relative to a row of plants according to one embodiment of the system of the present invention;

FIG. 3 shows a top view of a sensor assembly according to one embodiment of the present invention including multiple emitter and receiver arrays, distance sensors, a multi-spectral device, and additional sensor types for measuring plant characteristics;

FIG. 4 shows an exemplary image of a plant profile that may be generated according to some embodiments of the sensor assembly of the present invention;

FIG. 5 shows an exemplary image of a top view of a plant (and associated spectrographs) that may be generated by a spectral camera positioned generally above a plant according to some embodiments of the sensor assembly of the present invention;

FIG. 6A shows an exemplary camera image generated by the camera component of the multi-spectral device of the system of the present invention;

FIG. 6B shows an example of a camera image generated by the multi-spectral device of a system the present invention wherein the image has been optimized using spectrographic data;

FIG. 6C shows an example of a spectrographic data plot for plant matter surrounded by a soil substrate as generated by the spectrograph component of a multi-spectral device included in some embodiments of the system of the present invention;

FIG. 7A shows an exemplary plant profile and top view profile of a typical maize plant;

FIG. 7B shows an exemplary plant profile and top view profile of a typical weed plant;

FIG. 8 shows a flow chart of one embodiment of the method of the present invention comprising generating a plant characteristic data set using a sensor assembly positioned about a row of plants;

FIG. 9 shows a flow chart of one embodiment of the method of the present invention comprising generating a plant characteristic data set and generating a binary image of a plant using the plant characteristic data set;

FIG. 10 shows a flow chart of one embodiment of the method of the present invention further comprising advancing a sensor assembly along a row of plants to generate and display a two-dimensional plant profile to a user;

FIG. 11 shows a flow chart of one embodiment of the method of the present invention comprising generating a plant characteristic data set comprising a location of a position of a stem axis of a plant;

FIG. 12 shows a flow chart of one embodiment of the method of the present invention comprising generating a plant characteristic data set comprising a multi-spectral image of a plant;

FIG. 13 shows a flow chart of one embodiment of the method of the present invention comprising generating a plant characteristic data set comprising a row location of a plant as transmitted by a shaft encoder device operably engaged with the sensor assembly;

FIG. 14 shows a flow chart of one embodiment of the method of the present invention comprising generating a plant characteristic data set comprising a GPS coordinate set corresponding to a plant location;

FIG. 15 shows a flow chart of one embodiment of the method of the present invention comprising generating a plant characteristic data set for a plant of interest and storing the plant characteristic data set in a memory device; and FIG. 16 shows a flow chart of one embodiment of the method of the present invention further comprising identifying a plant by comparing a generated plant characteristic data set to a stored plant characteristic data set corresponding to a selected plant of interest.

DETAILED DESCRIPTION OF THE INVENTION

The present inventions now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

While the embodiments of the present invention are described below in the context of an agricultural environment for growing maize plants in rows defining row axes, it should be understood that the embodiments of the present invention may also be used to measure the physical characteristics of various other types of plants, which may be cultivated in a variety of configurations and environments. For example, in some embodiments, the sensor assembly 100 of the present invention may be statically positioned in a greenhouse and/or laboratory such that potted and/or container-cultivated plants may be conveyed to a position relative to the sensor assembly 100 such that the plants 10 may be scanned and/or measured using the embodiments of the present invention. In addition, one skilled in the art will appreciate that the methods and computer program products of the present invention may also be used to characterize, identify, catalog, and measure phenotypic traits of a variety of different plants that may include a variety of crops, weeds, native plants, invasive plant species, and or other objects present in an agricultural environment that may have a measurable profile when exposed to the sensor assembly of the present invention.

FIG. 1 shows a perspective view of a sensor assembly 100 that may be provided as part of a system for measuring physical characteristics of plants 10 within a row of generally defining a row axis 20, wherein each plant 10 in the row defines a stem axis 30 extending substantially vertically from the row axis 20 in an agricultural environment, such as, for example, a field, greenhouse, research plot, and/or other cultivation environment. According to one embodiment, the system comprises a sensor assembly 100 including a plurality of emitters 110a arranged in an emitter array 110 and a plurality of receivers 110b arranged in a receiver array 120 and disposed substantially opposite and parallel to the emitter array 110. The receiver array 120 may thus be positioned and configured to receive a plurality of signals emitted by the emitters 110a. As shown in FIG. 1, the sensor assembly 100 may be positioned relative to the row axis 20 such that the receiver array 120 and the emitter array 110 may be aligned and positioned on opposite sides of the row of plants 10. While FIG. 1 generally shows the emitter array 110 and the complementary receiver array 120 extending substantially parallel to the stem axis 30, the sensor assembly 100 may also be positioned at various angular positions relative to either the stem axis 30 or the row axis 20 such that the emitter and receiver arrays 110, 120 may be used to capture data related to various portions of the plants 10 or other features of the agricultural environment, including topography, large debris, or other features that may be measured and/or used to block the signals emitted by the emitter array 110.

The sensor assembly 100 may comprise, in some embodiments, an industrial light curtain apparatus, such as for example the Konturflex LUMIflex K-5-320 by Leuze Electronic. Such light curtain devices may be configured to emit optic signals from the emitter array 110 that may be received by a complementary receiver array 120 that is aligned therewith such that individual emitters 110a are accurately aligned with complementary individual receivers 120a disposed within the receiver array 120. According to other embodiments, the sensor array 100 may also comprise a plurality of photodiodes serving as individual emitters 110a within the emitter array 110. In such embodiments, the receivers 120a may comprise individual photosensors configured to detect signals emitted by complementary photodiodes. In addition, according to some embodiments, such as that shown generally in FIG. 3 (showing a top view of the sensor assembly 100), the sensor assembly 100 may comprise several complementary pairs of emitter arrays 110 and receiver arrays 120 arranged at various angles relative to the row axis 20 such that the sensor assembly 100 may generate an image of the profile of the individual plants 10 in the row that takes into account the statistical orientation of the single plant 10. In some embodiments, multiple complementary emitter arrays 110 and receiver arrays 120 may also be interleaved, so that for a given left and right side of the sensor assembly 100, the left side would comprise, in an alternating pattern, an emitter array 110, receiver array 120, emitter array 110, etc., and the right side would thus comprise complementary receiver array 120, emitter array 110, receiver array 120, etc.

In some embodiments, multiple array pairs 110, 120 may be used for purposes including, but not limited to: capturing a different angle/view of the plant; capturing redundant images of a plant 10 in order to clarify the images generated in a dusty and/or otherwise obscured environment; and/or providing different sensing capabilities based on wavelength or resolution of particular array pairs 110, 120. In some embodiments, two different array pairs having different emitter 110a and receiver 120a quantity and spacing. For example, one array pair 110, 120 may comprise a "high resolution" sensor defining 50 beams with 5 millimeters of vertical separation between beams and a second array pair 110, 120 may provide lower resolution with 10 millimeters of vertical separation between beams. Each array pair 110, 120 may prove advantageous based on the plant characteristics being measured. In some cases the low-resolution array pair is preferred since there is less generated noise. In addition, one or more supplementary array pairs 110, 120 may be used with beams of higher intensity or of a different wavelength to provide additional filtering of noise or inconsequential plant sections.

As described in further detail below, the computer device 120 of the present invention may then receive data sets from the various receiver arrays 120 and generate a comprehensive profile image of the plant 10 that may include data from several receiver arrays 120 that may be disposed in several positions within the sensor assembly 100 as shown generally in FIG. 3.

As shown in FIG. 1, the system embodiments of the present invention may also comprise a computer device 200 in communication with the sensor assembly 100 for controlling the emission and reception of signals by the emitters 110a and the receivers 120a. The computer device 200 may be configured to be capable of controlling the emitters 110a to emit a plurality of signals such that a portion of a plant 10 (such as a leaf, stalk, stem, flower, and/or other plant structure) in the row obscures at least a portion of the plurality of signals. According to some embodiments, the emitters 110a may be passive emitters (i.e., always "on" and/or always emitting a signal") such that the computer device 200 may be capable of reading, at a given time, the state of the signals (or beams formed thereby) that are broken by an obstruction (such as a plant 10, or portion thereof). Furthermore, the computer device 200 may also be capable of receiving a profile data set generated by the receivers 120a in response to the reception (or lack thereof) of the plurality of signals. The profile data set received from the receivers 120a may comprise a plurality of positive data points corresponding to a received signal and a plurality of negative data points corresponding to the portion of the plurality of signals obscured by the plant 10 (and correspondingly not received by the receivers 120a). For example, in one embodiment, the combinations of "broken beams" (or obstructed light signals) may be read as a binary output from the receiver array 120, wherein a binary "1" is a continuous, or received signal, and a binary "0" is a broken beam or obscured signal. In some embodiments, the binary definitions of broken and continuous beams and/or signals may also be reversed. In addition, in response to the data set received from the receivers 120a, the computer device 200 may generate a plant characteristic data set that comprising at least the plant profile data set (which may comprise, for example, a binary string (i.e., 0010100101)) which may be integrated with data received from a plurality of other sensors such that the computer device may be capable of generating a plant characteristic data set comprising both plant profile data and a variety of other data types related to the physical attributes of one or more plants, as described below.

Furthermore, as shown in FIG. 2, some embodiments of the system of the present invention may further comprise a wheeled carriage (including, for example, a pair of wheels 101 disposed on an axle) operably engaged with the sensor assembly 100 for advancing the sensor assembly 100 along the row axis 20. In such embodiments, the computer device 120 may further control the emitters 110a to repeatedly emit the signals at a selected rate that may correspond to the speed at which the wheeled carriage is advanced along the row axis 20. The sensor assembly 100 may also be advanced along the row axis by other mechanisms or processes, including via a carrier assembly onboard a piece of agricultural machinery such as a combine, tractor, planter, irrigation rig, or other mechanism. For example, in some embodiments, the sensor assembly 100 may be carried by a "fork" attachment at the front or rear of a tractor or other piece of agricultural equipment. In addition, the sensor assembly may also be carried by hand by an individual operator through a research plot and placed over a plant of interest in order to measure a single "slice" of the plant 10 profile at one particular position along the row axis 20. According to some alternate embodiments, the sensor assembly 100 may be placed over an individual plant 10 and rotated the stem axis 30 to generate a 360 degree profile of the plant 10. In such embodiments, a shaft encoder may also be disposed about a bearing shaft carrying the rotatable sensor assembly 100 such that the radial position of the emitter arrays 110 and receiver arrays 120 may be accurately determined and/or added to the plant characteristic data set. As described in further detail below, the sensor array 100 of the present invention may also comprise a global positioning system (GPS) device for precisely locating the sensor assembly 100. Thus, such hand-carried sensor assembly 100 embodiments may be used to log the location of a particular plant 10 as well as the height of the plant 10 in order to evaluate, track, and/or determine the height of plants 10 in particular locations within the agricultural environment. In other embodiments, the sensor assembly 100 of the present invention may be suspended from a ceiling-mounted track system (in greenhouse applications, for example) and/or from a conveyor system disposed adjacent to the row axis 20 (such as a track or conveyor belt).

According to some system embodiments, the computer device 120 may trigger the emitters 110a to emit the signals at a predetermined rate such that the corresponding receivers 120a receive the signals and the computer device further generates a two-dimensional profile of the plant by compiling the data generated by said receivers at a plurality of longitudinal points along the row axis. For example, as shown in FIG. 4, the sensor assembly 100 (including complementary emitter 110 and receiver arrays 120) may be advanced along the row axis 20) such that the computer device 200 may generate a two-dimensional profile (displayed via the user interface 210) of the plant 10 by compiling data sets received from the receiver array 120 and data related to the speed of the advancement of the sensor assembly 100 along the row axis 20. In other embodiments, (as shown generally in the top view of a system in FIG. 2) a shaft encoder 150 (or other transducer device for measuring rotational movement or velocity) may be operably engaged with an axle of a wheel 101 for conveying the sensor array, such that the shaft encoder 150 may transmit a location data set (indicating a linear position along the row axis 20, for example) to the computer device 200. Using the encoder information, and wheel 101 diameter data that may be stored in a memory device 220 within or in communication with the computer device 200, the computer device 200 may determine a distance along the row axis 20. The computer device 200 may, in turn, add the location data set generated by the shaft encoder to the plant characteristic data set generated by the receivers 120 to generate a two-dimensional plant 10 profile that may be displayed to a user of the system via a user interface 210, such as a display, in communication with the computer device 200.

According to some system embodiments, the shaft encoder 150 may be used as a trigger device to control the computer device 200 to read data from the receiver array 120 at specified distance interval (such as every millimeter traveled by the sensor assembly 100). The plant profile data set (such as a binary stream of "1's" and "0's") is cached into the memory device 220 to build a binary profile image of the plant 10. Subsequently, the computer device 200 may apply an algorithm to analyze the binary image. For example, according to some system and method embodiments of the present invention, the binary image may be used to identify a plant of interest and distinguish it from another plant type and/or other debris or obstructions that may be present in an agricultural environment.

An example of a plant 10 profile that may be generated using the plant profile data is shown generally in FIG. 4 wherein the plant profile is shown from the point of view of the receiver array 120 (that may be positioned parallel to the row axis 20). According to some system embodiments, the computer device 200 generates a binary image (such as that shown generally in FIG. 4) based on the plant characteristic data set and displays the binary image to a user via the user interface 210. The computer device 200 may also comprise a memory device 220 in communication therewith such that the computer device may add the generated binary image to the plant characteristic data set and store the integrated plant characteristic data set for later use in comparison or identification processes.

In other system embodiments of the present invention, the sensor assembly 100 may also comprise a variety of other sensors, transducers, and/or other measurement or imaging devices that may also be in communication with the computer device 200 for measuring and/or classifying a variety of characteristics that may be exhibited by a plant 10. Such characteristics may include, but are not limited to: plant height; two-dimensional plant profile (as discussed above); precise geographical location of the plant 10, top-view plant profile; spectral signature of the plant; location of the plant 10 relative to the sensor assembly 100 and/or row axis 20; longitudinal position of the plant 10 along the row axis 20 (as described generally above with respect to the shaft encoder 150); and/or other plant characteristics that may be indicative, in some cases, of plant genotype and plant viability.

Furthermore, the sensor assembly 100 (in cooperation with the computer device 200 may be further configured to utilize the plant characteristic data to generate and/or store a count of a plurality of plants so as to compile population data for a certain number of plants. Thus, using such embodiments, researchers may obtain data as to the relative population of crop plants versus weeds or invasive species in a particular stand and/or row of plants (using plant count data and plant characteristic data corresponding to each counted plant). Thus, in such embodiments, a density and/or plant population per a selected physical unit (i.e. per acre, per row, per research plot) may be computed using count data obtained by the sensor assembly 100 and stored by the computer device 200. According to such embodiments, the selected "area" or other physical unit used to calculate population density of a particular plant may have a previously-developed start and end point (stored in the computer device 200, for example) wherein the start and end points are provided by a GPS device and/or other locator devices that may be included as part of the sensor assembly 100, as described further herein. Such embodiments may then allow then a computer program product or routine (housed, for example, in the computer device 200) to sum the number of plants discretely identified, by the sensor assembly 100, for example, between the starting point to the ending point of a particular physical unit or area. Other embodiments may utilize pre-programmed logic to segment plant characteristic data sets received from the sensor assembly 100 by, for example, research plot, row number, and/or other physical unit. For example, the system may be able to infer that an observed gap in plants (as indicated by the sensor assembly's 100 lack of detected plant matter) is a space between plots and that therefore it should reset the count for a new physical unit. More particularly, such logic steps may include the following logic "rules" stored in a memory device in communication with and/or part of the computer device 200: (1) all research plots have at least X plants per plot; (2) alleys are at least 24"; and (3) if X number of plants have been counted and a 24" gap is observed then a new plot is starting and the count should be reset. Such logic-based embodiments may, for example, reduce the dependence of the system on GPS positioning data and/or be utilized as a redundant "check" on GPS data stored as part of the plant characteristic data set.

Such measurable plant 10 characteristics may also be used by the computer device 200 of the present invention to identify plants of interest and/or plants exhibiting selected phenotypic responses by comparing measured plant characteristics to characteristics stored within a memory device 220 in communication with the computer device 200 of the present invention. As described in further detail below, various data types may be produced by the variety of additional sensors that may be received by the computer device 200 and thereafter added to the plant characteristic data set for storage and/or use in identification, cataloging, and/or measurement processes.

Some embodiments of the present system, as shown, for example, in FIGS. 2 and 3, may further comprise a plurality of distance sensors 140a, 140b, 140c wherein at least one of the distance sensors 140c is positioned on a side of the sensor assembly 100 with the emitter array 110 and opposite the receiver array 120. The distance sensor 140c may be disposed on a lower portion of the sensor assembly and positioned so as to be capable of emitting a triangulating signal that reaches the stem axis 30 of the plant 10 such that the distance sensor 140c may accurately determine the distance between the sensor's 140c position on the sensor assembly 100 and the position of the stem axis 30 of the plant. Furthermore, in some system embodiments, an additional distance sensor 140b may also be provided and disposed on a side of the sensor assembly 100 opposite the distance sensor 140c so as to be capable of providing a second distance measurement between the second distance sensor 140c and the stem axis 30. Thus, the combination of distance sensors 140c, 140b may be used to accurately determine the position of the stem axis relative to the emitter array 110 side of the sensor assembly 100 and the receiver array 120 side of the sensor assembly.

According to other embodiments, a third distance sensor 140a may also be disposed on the sensor assembly 100 to determine a height of the plant 10 by determining a distance between a top portion 102 of the sensor assembly 100 and the topmost point of the plant 10. For example, as shown generally in FIG. 2, the distance sensor 140a may be positioned to emit a laser triangulation signal down from the top portion 102 of the sensor assembly 100 to determine the height of a plant 10 over which the sensor assembly 100 may be advanced.

Furthermore, according to various system embodiments of the present invention, the computer device 200 may be in communication with the distance sensors 140a, 140b, 140c for locating a position of the stem axis 30 and a top-most portion of the plant 10 relative to the sensor assembly 100. For example, while the distance sensors may be configured to measure a distance between their positions on the sensor assembly 100, the computer device 200 (and/or a memory device 220 in communication therewith) may be capable of storing dimensional specifications of the sensor assembly 100 (such as the width and/or height of the sensor assembly 100) such that the computer device 200 may be capable of using the dimensional specifications and the distance data returned by one or more triangulations sensors 140a-140c to determine the position of the stem axis 30 of a plant 10, the height of a particular plant 10, and/or the diameter of a plant 10 stem (using, for example, two opposing distance sensors 140b, 140c).

The distance sensors may comprise various types of sensors for measuring distance including, but not limited to: triangulation sensors, optical encoders, laser diode arrays suitable for measuring distance; position sensitive devices (PSD's); CMOS devices; and/or charge coupled devices (CCD's). Additional distance sensors may also be added to the sensor assembly 100 according to other system embodiments, for providing supplemental distance measurements between the location of the distance sensor on the sensor assembly and the location of a particular plant part.

The system of the present invention may also comprise (as shown generally in the top views of FIGS. 2 and 3) a multi-spectral device 130 (such as a camera 130 and/or hyper-spectral device) operably engaged with a top portion 102 (such as a cross-rail) of the sensor assembly 100 for capturing a multi-spectral image of the plant 10 from a position above the plant 10 so as to differentiate the plant from a plurality of surrounding materials (such as soil, dust, weeds, foreign objects, and/or other vegetation that may be present in the cultivation environment. The multi-spectral device 130 may be positioned at a center point between the emitter array 110 and receiver array 120 (see FIG. 2, for example) such that the camera 130 may be capable of capturing an image of the plant 10 from a central perspective along the row axis 20. In other embodiments, the multi-spectral device 130 may also be "side" mounted to capture side profile images of the plant 10. For example, the multi-spectral camera 130 may be positioned on one or both of the emitter 110 and receiver 120 sides of the sensor assembly 100 for capturing a multi-spectral image of the side profile of the plant 10.

The multi-spectral device 130 may comprise, for example, an imaging spectrograph alone and/or in combination with an industrial monochrome camera such that the spectral camera 130 may take advantage of the differing reflectivity and spectral signatures of soil, weeds, and/or the plant 10 of interest in order to generate an accurate depiction of the plant's 10 leaf shape and leaf geometry. In some embodiments, however, the multi-spectral device 130 comprises only a spectrograph capable of generating a line-scan to build a composite image in, for example, the green region of the spectrum. By isolating the green region, background noise and dirt may be eliminated from the spectrograph and pattern matching (comparing, for example, a stored leaf patter of a plant of interest to the generated spectrograph) may be used based on the composite image. According to some embodiments, an imaging spectrograph such as the ImSpector (produced by Specim) is used in conjunction with an industrial camera to generate a multi-spectral overhead image of a plant 10. As discussed above, imaging spectrographs such as the ImSpector may be used along and/or in conjunction with a camera to generate an image of the plant 10. In other embodiments, CMOS cameras and/or additional digital camera technologies can also be used to generate a base image (see FIG. 6A, for example) for the spectral camera 130. The computer device 200 of the present invention may then receive the camera image and enhance the differences between plant material and surrounding soil material (using differences in spectral signature) as detected by the imaging spectrograph in order to generate a multi-spectral image of the plant as shown generally in FIG. 6B. FIG. 6A generally shows an unenhanced camera image. Furthermore, FIG. 6B shows an enhanced multi-spectral image generated by the multi-spectral device 130 differentiating plant leaf material from surrounding soil material. FIG. 6C shows a spectrograph indicating the relative spectral signatures of the plant and soil materials in the image. The input from the spectrograph component of the multi-spectral device 130 may thus allow the camera to effectively generate images of plant material even in working agricultural environments that may be obscured by dust, moisture, fog, and/or other foreign materials that have a spectral signature that is significantly different from that of plant material.

According to some embodiments, the data compiled by the imaging spectrograph may also be used to generate quantitative plant data that may be indicative of plant phenotype, including, for example, chlorophyll content, photosynthesis and PAR (photosynthetically active radiation), nitrogen utilization, leaf thickness, leaf count, and other plant data. The imaging spectrograph may also be used to analyze plant 10 phenotypic properties in the infrared, ultraviolet, and/or other non-visible spectra. For example, water absorption levels may be detected by the multi-spectral device 130 when scanning in the near infra-red spectrum.

An exemplary multi-spectral image produced by a multi-spectral device 130 from a top view is shown generally in FIG. 5. According to some system embodiments of the present invention, such a multi-spectral image may be displayed to a user via the user interface 210 in communication with the computer device 200 of the system of the present invention. In addition, in some embodiments, the spectral image and data embodied therein may be received by the computer device 200 and added to the plant characteristic data set for a particular plant. Thus, the multi-spectral device image of the plant 10 may be linked with the plant profile data set (obtained from the sensor array 100) in the plant characteristic data set so as to provide a more complete set of plant characteristics that may be stored in a memory device 220 and/or compared with a stored plant characteristic data set of a known plant of interest in order to identify the known plant of interest in real-time or near-real-time applications.

According to other system embodiments of the present invention, the system may further comprise one or more devices configured to be capable of generating location data for a particular plant 10 such that the computer device 200 may add such location data to the plant characteristic data set and generate a map and/or catalog of plant 10 locations within a given agricultural plot, research plot, greenhouse zone, row number, and/or other division of cultivation area. For example, in some embodiments wherein the sensor assembly 100 of the present invention is advanced along the row axis 20 on a carriage comprising wheels 101 (as shown generally in the top view of FIG. 1), the wheeled carriage may comprise at least one axle (for carrying the wheels 101) and a shaft encoder 150 operably engaged with said axle for transmitting a location data set to the computer device 200 to determine a distance along the row axis 20. The computer device 200 may also further add the location data set generated by the shaft encoder 150 to the plant characteristic data set such that the plant characteristics may be linked to a location along the row axis 20 for mapping of particular phenotypes or for the accurate tagging of weeds for later automated weeding processes.

According to other system embodiments of the present invention, the system may further comprise a global positioning system (GPS) device 160 (as shown in FIG. 2) in communication with the computer device 200 for determining the position of the plant 10 using a global positioning system. As shown in FIG. 2, the GPS device may be co-located and/or located near a sensor for detecting plant height (such as the distance sensor 140*a*) such that the position of the plant may be plotted via GPS coordinates with accuracy up to a few inches (depending upon the GPS device used). Furthermore, the computer device 200 may further add the position of the plant 10 (as determined by the GPS device) to the plant characteristic data set such that the plant characteristics may be linked to a location along the row axis 20 for mapping of particular phenotypes or for the accurate marking of weeds for subsequent automatic weeding.

As shown in FIG. 1 and described above, system embodiments of the present invention may also comprise a memory device 220 in communication with the computer device 200 for storing the plant characteristic data set of a known plant of interest and/or a count of a plurality of plants of interest. For example, the computer device 200 of the present invention may be used to set the sensor assembly 100 to a "learn" mode wherein a user of the system may advance the sensor assembly 100 over a known plant of interest, such as an early-stage maize plant (as shown, for example, in profile from the top and side (parallel to the row axis 20) in FIG. 7A. Thus, the computer device 200 and the various sensors of the sensor assembly 100 may be used to generate a plant characteristic data set (as described above) for the maize plant. In another exemplary embodiment, the memory device 220 may be used to store a plant characteristic data set (comprising, for example, plant profile data; a plant multi-spectral image taken from a top-view perspective, or other plant characteristic data set data point) for a typical weed plant (such as that generally shown in FIG. 7B). The stored plant characteristic data sets for such "plants of interest" may then be used as comparative examples as the system of the present invention is used to identify the plant of interest by its distinguishing phenotype and/or mark the plant of interest by its location within the agricultural environment.

As described further below with respect to the method and computer program product embodiments of the present invention, the computer device 200 of the system of the present invention may also be engaged in an "identify" mode wherein the computer device 200 identifies the plant 10 by comparing the generated plant characteristic data set (taken in real-time or near-real time from the sensor assembly 100 and associated components (such as the multi-spectral device 130)) with the stored plant characteristic data set (stored in the memory device 220, for example) of the known plant of interest. Thus, the computer device 220, working in conjunction with the sensor assembly 100 and other components of the system of the present invention, may identify selected plants of interest as the sensor assembly 100 is advanced on a row axis 20 such that the system may rapidly identify and catalog the location, count, and physical traits of the selected plants of interest. Thus, the system of the present invention may allow for the identification and/or counting of maize or other crops, weeds, non-native or invasive plant species, and/or any other particular plant of interest within the agricultural environment.

According to some embodiments, one or more computer devices 200 may be distributed within the system for controlling the sensor assembly 100 and other system components as well as storing plant characteristic data and identifying particular plants based upon such data. For example, in some system embodiments of the present invention, distributed processing techniques may be utilized wherein a first computer device 200 (comprising, for example, a microcontroller) may be used for pre-processing plant characteristic data taken from the sensor assembly 100 and/or other system components (such as the multi-spectral device 130, distance sensors 140*a-c*, etc.). The first computer device may then be capable of compiling and/or refining an overall plant characteristic data set and sending the plant characteristic data set to a second computer device 200 (such as a main controller device) for subsequent storage and/or identification processes as described below in the method and computer program product embodiments of the present invention (see, e.g., steps 1610 and 1620 of FIG. 16).

Furthermore, some components of the system of the present invention may generate data that may be especially useful for tracking the expression of certain phenotypes within and among various genotypes including, but not limited to, genetically modified organisms (GMO's) or non-genetically-modified plant species that have been selectively bred to express certain phenotypic responses. For example, some maize plants may be selectively bred or genetically-modified to express larger stem diameters (to resist wind break, for example). According to some system embodiments of the present invention, an opposing pair of distance sensors 140*b*, 140*c* (as shown in FIGS. 2 and 3) may be used in conjunction with the computer device 200 to determine the stalk or stem diameter of a maize plant and catalog the location of specific plants that exhibit the increased diameter. Similar phenotype tracking may be accomplished using other components of the system of the present invention such as the multi-spectral device 130, which may detect certain leaf-pattern and/or color phenotypes. In addition, the spectral signature generated by the multi-spectral device 130 (see FIG. 5, for example, may be used to identify plants 10 with higher levels of chlorophyll, thicker leaves, and/or other physical traits that may be indicated by subtle changes in spectral signature.

The present invention also includes methods for measuring physical characteristics of individual plants 10 and/or groups of plants 10 positioned generally in a row defining a row axis 20 wherein each plant 10 in the row defines a stem axis 30 extending substantially vertically from the row axis 20 in an agricultural environment. FIG. 8 shows a flow chart of one method embodiment of the present invention, wherein step 810 includes providing a profile sensor assembly 100 including an emitter array 110 and a receiver array 120 disposed substantially opposite and parallel to the emitters for receiving a plurality of signals emitted by the emitter array 110. Step 810 also includes providing a computer device 200 in communication with the profile sensor assembly 100. Step 820 comprises positioning the sensor assembly 100 relative to the row of plants such that the receivers 120a and emitters 110a are positioned on opposite sides of the row axis 20 (as shown from above in FIG. 2, for example). Furthermore, step 830 comprises emitting the plurality of signals from the emitters 110a such that a portion of a plant 10 in the row obscures at least a portion of the plurality of signals. For example, step 830 may comprise emitting a light signal that may be obscured by a stem or leaf component of the plant such that step 840 comprises receiving a portion of the plurality of signals at the receivers 120a such that said receivers 120a generate a plant profile data set comprising a plurality of positive data points corresponding to a received signal (i.e., a signal that proceeds uninterrupted from an emitter 110a to a corresponding receiver 120a) and a plurality of negative data points corresponding to the signals obscured by the portion of the plant 10. Step 850 comprises generating a plant characteristic data set containing plant characteristic data based at least in part on the plant profile data received from the plurality of receivers 120a such that the plant characteristic data set may be used to measure the physical characteristics of the row of plants 10. For example, the plant profile data may be used to generate a binary image 210 of the plant 10 as shown in FIG. 4.

For example, as shown generally in FIG. 9, according to some method embodiments, the providing step 810 further comprises providing a user interface 210 in communication with the computer device 200, and the method may further comprise the following steps: step 910, including generating a binary image based on the plant characteristic data set; step 920, including displaying the binary image to a user via the user interface 210 (such as a display in communication with the computer device 200); and step 930, including adding the binary image (shown, for example, in the display 210 of FIG. 4) to the plant characteristic data set.

According to some method embodiments, as shown generally in FIG. 10, the generating step 910, may be accomplished by the computer device 200 of the present invention, which may compile the vertical locations of the positive and negative data points generated with the receiver array 120 over time as the sensor assembly 100 is advanced along the row axis 20 to generate a side profile image 210 of the plant 10. As shown in FIG. 10 the method may further comprise step 1010 which includes advancing the sensor assembly 100 along the row axis 20 (as shown in FIG. 4, for example). In such method embodiments, the emitting step (step 830) may further comprise repeatedly emitting the signals at a selected rate, and the generating step (step 850) may further comprise generating a two-dimensional profile of the plant by compiling the plant profile data set generated by said receivers at a plurality of longitudinal points along the row axis 20. Furthermore, step 1020 comprises adding the generated two-dimensional profile of the plant to the plant characteristic data set. Furthermore, in some embodiments, the generating step 850 may further comprise generating two-dimensional profiles for a variety of plants as the sensor assembly 100 is advanced so as to count a number of a plurality of plants in a given stand and/or row. The generated count may then be stored by the computer device 200 so as to collect and maintain a count of a particular plant of interest.

As described above with respect to the system embodiments of the present invention, various sensors and components may be used to generate a variety of plant characteristic data points to be included in the plant characteristic data set compiled by the computer device 200 of the present invention that may supplement the profile data, side profile image, and/or two-dimensional profile of the plant 10 that may be generated by the emitter array 110 and receiver array 120 of the sensor assembly 100. For example, the system of the present invention may also comprise one or more distance sensors 140a, 140b, 140c (as shown generally in FIGS. 2 and 3), for determining distances between the distance sensors (which may be operably engaged with the sensor assembly 100) and a stem (defining the stem axis 30, for example) and/or other plant structure of the plant 10. Thus, according to an alternative method embodiment, as shown generally in FIG. 11, the method may further comprise step 1110 for locating a position of the stem axis 30 relative to the sensor assembly 100 using one or more of the distance sensors 140a, 140b, 140c, and step 1120 for adding the located position of the stem axis 30 to the plant characteristic data set. Some distance sensors 140a may also be operably engaged with a top portion 102 of the sensor assembly 100 (see FIG. 3) such that the method embodiments of the present invention may also comprise locating a position of a leaf structure or a plant's 10 tallest point relative to a top-mounted distance sensor 140a configured to emit a light signal downward toward the plant 10 as the sensor assembly 100 is advanced on the row axis 10.

According to another method embodiment of the present invention, shown generally in FIG. 12, the method may further comprise, in step 1210, capturing a multi-spectral image (using a multi-spectral device 130, as described above) of the plant 10 from a position above the plant 10 so as to differentiate the plant 10 from a plurality of surrounding materials (such as soil, dust, fog, or other material). Step 1220 further comprises adding the multi-spectral image to the plant characteristic data set. Thus, the computer device 200 of the present invention may integrate the two-dimensional profile image (see element 210 shown in FIG. 4) with a multi-spectral image (see, for example, FIG. 6B) in the complete plant characteristic data set such that the plant 10 physical profile characteristics may be cataloged with a side profile and a corresponding top-view profile (see FIG. 7A for a top and side view profile of a typical maize plant). As described above, the capturing process of step 1210 may be accomplished by the combination of a camera image (see FIG. 6A, for example) with a spectrograph of the same or similar field of view (see FIG. 6C, for example) in order to generate the enhanced multi-spectral image as shown in FIG. 6B. Thus, the generating step 1210 may generate an enhanced multi-spectral top-view image of the plant 10 as the sensor assembly is advanced over the plant 10 that may reveal a detailed profile of the leaf pattern of the plant 10 regardless of the soil, dust, or other materials in the vicinity of the plant due to the differences in spectral signature between the plant material and surrounding materials that are highlighted by the spectrograph. Furthermore, step 1210 may be performed with the aid of the computer device 200 for more accurate integration of the camera image with the spectrograph to provide the multi-spectral image.

Some system embodiments of the present invention (as shown in FIG. 2, for example) include a sensor assembly 100 that is carried by a wheeled carriage having at least one wheel 101 and corresponding axle wherein a shaft encoder 150 operably engaged with the axle. Thus, some method embodiments of the present invention (shown in FIG. 13, further comprise step 1310 for transmitting a location data set from the shaft encoder 150 to a computer device 200 to determine a distance along the row axis 20, and step 1320 for adding the location data set to the plant characteristic data set. Thus, steps 1310 and 1320 may be performed to determine and catalog the location of a particular plant 10 along the row axis 20 (which may be defined relative to a "home" position defined by a field edge, fence, greenhouse wall, road, or other landmark and/or barrier). Other method embodiments of the present invention (shown generally in FIG. 14, further comprise step 1410 for determining a geographical position of the plant 10 (to supplement or replace the determination of the linear position of the plant as shown in step 1310, above) using a global positioning system (GPS) device 160 (that may be mounted and/or co-located with the multi-spectral device 130 and/or top-mounted distance sensor 140a (see FIG. 2) such that the GPS device may accurately record precise GPS coordinates as the plant 10 is detected). Step 1420 further comprises adding the determined position of the plant 10 to the plant characteristic data set. Thus, step 1420 may link plants 10 having certain detected physical traits or phenotypes to a distinct geographical location that may be accurately plotted to within a few centimeters, depending upon the GPS device 160 used.

FIG. 15 shows a method for "teaching" the sensor assembly 100 of the present invention comprising step 1510 for storing the plant characteristic data set of a known plant of interest in a memory device 220 in communication with the computer device 200. Step 1510 thus allows the computer device to associate a particular plant characteristic data set with a selected plant of interest (such as a targeted weed type having distinct physical properties, or a maize plant with a certain preferred phenotype.) The "teaching" step depicted as step 1510 of FIG. 15 thus enables the computer device to identify, in real-time or near-real-time, the plant 10 being evaluated by the sensor assembly 100 by comparing the generated plant characteristic data set (generated in near-real-time) with the stored plant characteristic data set of the known plant of interest (that has been "taught" to the computer device 200 as part of step 1510. FIG. 16 depicts the plant identification step 1610 described above. Step 1610 may be accomplished using one or more of the distinct data points within the plant characteristic data set.

Furthermore, the plant identification step 1610 may be performed in conjunction with a counting step such that the sensor assembly 100 (in cooperation with the computer device 200) may be rendered capable of maintaining a count of several different plants of interest (identified, for example, in step 1610 by particular plant characteristic data sets) during a single "pass" of the sensor assembly 100 through a stand of plants that may include, for example, a stand of crop plants interspersed with weeds and/or invasive plant species. Thus, such method embodiments may be used to assess the population of crop plants in a particular stand versus the relative population of weeds of interest in the same general area of a stand or research plot. As described herein with respect to the system embodiments, the counting step may comprise counting a number of plants per a physical unit (such as per unit area, per row, per research plot, for example) such that the method may further comprise determining a density of a particular type of plant (such as a selected crop plant and/or weed) that may be present in a given physical unit (such as a row or a particular research plot).

As described herein, plant characteristic data sets may be populated with images (as depicted in steps 930, 1020, and 1220), plant location data (as depicted in steps 1120, 1320, 1420), plant spectrographic data (generated in step 1210), and other data types such that the computer device 200 may be capable, in some method and computer program embodiments of selecting one or more of the data types within the plant characteristic data set that provide the strongest correlation with the "learned" or stored characteristics of the selected plant of interest. Thus, the methods of the present invention may provide a robust and repeatable process for accurately identifying and locating plants of interest in a working agricultural environment such that the results of such method may be further used by users for accurately marking weeds for automated removal and/or locating individual plants having a desirable and/or selected phenotype.

In addition to providing systems and methods, the present invention also provides computer program products for performing the operations described above. The computer program products have a computer readable storage medium having computer readable program code embodied in the medium. With reference to FIG. 1, the computer readable storage medium may be part of the memory device 220 and may implement the computer readable program code to perform the above discussed operations.

In this regard, FIGS. 8-16 are block diagram illustrations of methods, systems and program products according to the invention. It will be understood that each block or step of the block diagram and combinations of blocks in the block diagram can be implemented by computer program instructions. These computer program instructions may be loaded onto a computer or other programmable apparatus to produce a machine, such that the instructions which execute on the computer or other programmable apparatus are capable of implementing the functions specified in the block diagram, flowchart or control flow block(s) or step(s). These computer program instructions may also be stored in a computer-readable memory that can direct a computer or other programmable apparatus to function in a particular manner, such that the instructions stored in the computer-readable memory produce an article of manufacture including instructions which implement the function specified in the block diagram, flowchart or control flow block(s) or step(s). The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the block diagram, flowchart or control flow block(s) or step(s).

Accordingly, blocks or steps of the block diagram, flowchart or control flow illustrations support combinations of sets of computer instructions for performing the specified functions, combinations of steps for performing the specified functions and program instructions for performing the specified functions. It will also be understood that each block or step of the block diagram, flowchart or control flow illustrations, and combinations of blocks or steps in the block diagram, flowchart or control flow illustrations, can be implemented by special purpose hardware-based computer systems which perform the specified functions or steps, or combinations of special purpose hardware and computer instructions.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system for measuring physical characteristics of a plant in an agricultural environment, the system comprising:
    a sensor assembly including a plurality of emitters and a plurality of receivers disposed substantially opposite and parallel to said plurality of emitters for receiving a plurality of signals emitted by said emitters such that said receivers and said emitters may be positioned on opposite sides of the plant;
    a computer device in communication with said sensor assembly for detecting the reception of signals by said receivers;
    wherein said emitters emit the plurality of signals such that a portion of the plant obscures at least a portion of the plurality of signals;
    wherein said computer device receives a plant profile data set generated by said plurality of receivers comprising a plurality of positive data points corresponding to a received signal and a plurality of negative data points corresponding to the portion of the plurality of signals obscured by the plant; and
    wherein said computer device generates a plant characteristic data set containing plant characteristic data based at least in part on the plant profile data received from said plurality of receivers such that the plant characteristic data set may be used to measure the physical characteristics of the plant.

2. A system according to claim 1, wherein said computer device further controls said emitters to emit the plurality of signals.

3. A system according to claim 1, wherein said sensor assembly comprises at least one of:
    an industrial light curtain;
    a plurality of photodiodes substantially aligned with a corresponding plurality of optical sensors; and
    combinations thereof.

4. A system according to claim 1, further comprising a movable assembly operably engaged with said sensor assembly for advancing said sensor assembly along a row of plants including the plant and defining a row axis, and wherein said computer device further controls said emitters to repeatedly emit the signals at a selected rate and wherein said computer device further generates a two-dimensional profile of the plant by compiling the plant profile data set generated by said receivers at a plurality of longitudinal points along the row axis, and wherein said computer device further adds the generated two-dimensional profile of the plant to the plant characteristic data set.

5. A system according to claim 1, wherein said movable assembly comprises at least one of:
    a wheeled carriage;
    a trailer;
    an attachment for carriage by a mobile agricultural mechanism; and
    combinations thereof.

6. A system according to claim 1, further comprising a user interface in communication with said computer device and wherein said computer device further generates a binary image based on the plant characteristic data set and displays the binary image to a user via said user interface and wherein said computer device further adds the binary image to the plant characteristic data set.

7. A system according to claim 1, further comprising a distance sensor disposed on the sensor assembly such that the distance sensor measures a distance to a portion of the plant, and wherein said computer device is in communication with said distance sensor for locating a position of the portion relative to said sensor assembly and wherein said computer device further adds the located position of the portion of the plant to the plant characteristic data set.

8. A system according to claim 1, further comprising a multi-spectral device operably engaged with a top portion of said sensor assembly for capturing a multi-spectral image of the plant from a position above the plant so as to differentiate the plant from a plurality of surrounding materials, and wherein said computer device is in communication with said multi-spectral device for receiving the multi-spectral image, and wherein said computer device further adds the multi-spectral image to the plant characteristic data set.

9. A system according to claim 1, wherein said sensor assembly further comprises a locator device in communication with said computer device for transmitting a location data set to said computer device to determine a location of the plant, and wherein said computer device further adds the location data set to the plant characteristic data set.

10. A system according to claim 9, wherein said locator device is at least one of:
    an optical encoder;
    a laser encoder;
    a dead-reckoning device comprising a gyroscope and/or an accelerometer;
    a global positioning system device; and
    combinations thereof.

11. A system according to claim 4, wherein said movable assembly comprises at least one axle and wherein said sensor assembly further comprises a shaft encoder operably engaged with said axle and in communication with said computer device for transmitting a location data set to said computer device to determine a distance along the row of plants, and wherein said computer device further adds the location data set to the plant characteristic data set.

12. A system according to claim 1, further comprising a global positioning system device in communication with said computer device for determining a position of the plant using a global positioning system, and wherein said computer device further adds the position of the plant to the plant characteristic data set.

13. A system according to claim 1, further comprising a memory device in communication with said computer device for storing the plant characteristic data set of a known plant of interest in the memory device.

14. A system according to claim 13, wherein said computer device further identifies the plant by comparing the generated plant characteristic data set with the stored plant characteristic data set of the known plant of interest.

15. A system according to claim 1, wherein said computer device further maintains a count of a number of a plurality of plants for which a corresponding plurality of plant characteristic data sets are generated.

16. A system according to claim 15, wherein said computer device further determines the count of the number of the plurality of plants located in at least one physical unit based at least in part on the corresponding plurality of plant characteristic data sets.

17. A system according to claim 16, wherein the at least one physical unit is selected from the group consisting of:
- a row;
- an agricultural plot; and
- combinations thereof.

18. A method for measuring physical characteristics of a plant in an agricultural environment, the method comprising:
- providing a sensor assembly including a plurality of emitters and a plurality of receivers disposed substantially opposite and parallel to said plurality of emitters for receiving a plurality of signals emitted by said emitters and a computer device in communication with said profile sensor assembly;
- positioning said sensor assembly relative to the plant such that said receivers and said emitters are positioned on opposite sides of the plant;
- emitting the plurality of signals from said emitters such that a portion of the plant obscures at least a portion of the plurality of signals;
- receiving a portion of the plurality of signals at said receivers such that said receivers generate a plant profile data set comprising a plurality of positive data points corresponding to a received signal and a plurality of negative data points corresponding to the signals obscured by the portion of the plant; and,
- generating a plant characteristic data set containing plant characteristic data based at least in part on the plant profile data received from said plurality of receivers such that the plant characteristic data set may be used to measure the physical characteristics the plant.

19. A method according to claim 18, further comprising:
- advancing said sensor assembly along a row of plants including the plant and defining a row axis, wherein the emitting step further comprises repeatedly emitting the signals at a selected rate, and wherein the generating step further comprises generating a two-dimensional profile of the plant by compiling the plant profile data set generated by said receivers at a plurality of longitudinal points along the row axis; and
- adding the generated two-dimensional profile of the plant to the plant characteristic data set.

20. A method according to claim 18, wherein said providing step further comprises providing said plurality of emitters extending substantially parallel to a stem axis of the plant.

21. A method according to claim 18, wherein the providing step further comprises providing a user interface in communication with said computer device, the method further comprising:
- generating a binary image based on the plant characteristic data set;
- displaying the binary image to a user via said user interface; and
- adding the binary image to the plant characteristic data set.

22. A method according to claim 18, wherein said sensor assembly further comprises a distance sensor, the method further comprising:
- locating a position of the portion of the plant relative to said sensor assembly using said distance sensor; and
- adding the located position of the portion of the plant to the plant characteristic data set.

23. A method according to claim 18, wherein said sensor assembly further comprises a multi-spectral device, the method further comprising:
- capturing a multi-spectral image of the plants from a position above the plant so as to differentiate the plant from a plurality of surrounding materials; and
- adding the multi-spectral image to the plant characteristic data set.

24. A method according to claim 18, wherein said sensor assembly further comprises a locator device in communication with said computer device; the method further comprising:
- transmitting a location data set from said locator device to said computer device to determine a location of the plant; and
- adding the location data set to the plant characteristic data set.

25. A method according to claim 19, wherein said sensor assembly is carried by a movable assembly having at least one axle and wherein said sensor assembly further comprises a shaft encoder operably engaged with said axle, the method further comprising:
- transmitting a location data set from said shaft encoder to said computer device to determine a distance along the row of plants; and
- adding the location data set to the plant characteristic data set.

26. A method according to claim 18, wherein said sensor assembly further comprises a global positioning system device, the method further comprising:
- determining a position of the plant using a global positioning system; and
- adding the determined position of the plant to the plant characteristic data set.

27. A method according to claim 18, wherein the providing step further comprises providing a memory device in communication with said computer device, the method further comprising storing the plant characteristic data set of a known plant of interest in the memory device.

28. A method according to claim 27, further comprising identifying the plant by comparing the generated plant characteristic data set with the stored plant characteristic data set of the known plant of interest.

29. A method according to claim 18, further comprising:
- counting of a number of a plurality of plants for which a corresponding plurality of plant characteristic data sets are generated; and
- storing the counted number of the plurality of plants.

30. A method according to claim 29, further comprising determining the number of the plurality of plants located in at least one physical unit based at least in part on the corresponding plurality of plant characteristic data sets.

31. A method according to claim 30, wherein the at least one physical unit is selected from the group consisting of:
- a row;
- an agricultural plot; and
- combinations thereof.

32. A computer program product for controlling a computer device in communication with a sensor assembly comprising a plurality of emitters and a corresponding plurality of receivers disposed substantially opposite and parallel to said emitters for receiving a plurality of signals emitted by said emitters to determine physical characteristics of a plant in an agricultural environment, wherein a portion of a plant obscures at least a portion of the plurality of signals, the computer program product comprising a computer-readable storage medium having computer-readable program code instructions stored therein comprising:
- a first set of computer instructions for receiving a portion of the plurality of signals at said receivers such that said receivers generate a plant profile data set comprising a plurality of positive data points corresponding to a received signal and a plurality of negative data points corresponding to the signals obscured by the portion of the plant; and, a second set of computer instructions for generating a plant characteristic data set containing plant characteristic data based at least in part on the plant profile data received from said plurality of receivers such that the plant characteristic data set may be used to measure the physical characteristics of the plant.

33. A computer program product according to claim 32, wherein said sensor assembly is advanced along a row of plants including the plant and defining a row axis, the computer program product further comprising:

a third set of computer instructions for controlling said emitters to repeatedly emit the signals at a selected rate, and wherein said second set of computer instructions further comprises a fourth set of computer instructions for generating a two-dimensional profile of the plant by compiling the data generated by said first set of computer instructions at a plurality of longitudinal points along the row axis; and a fifth set of computer instructions for adding the generated two-dimensional profile of the plant to the plant characteristic data set.

34. A computer program product according to claim 32, further comprising:

a third set of computer instructions for generating a binary image based on the plant characteristic data set;

a fourth set of computer instructions displaying the binary image to a user via said user interface; and a fifth set of computer instructions for adding the binary image to the plant characteristic data set.

35. A computer program product according to claim 32, wherein said sensor assembly further comprises a distance sensor, the computer program product further comprising:

a third set of computer instructions for locating a position of the portion of the plant relative to said sensor assembly using said distance sensor; and a fourth set of computer instructions for adding the located position of the portion of the plant to the plant characteristic data set.

36. A computer program product according to claim 32, wherein said sensor assembly further comprises a multi-spectral device, the computer program product further comprising:

a third set of computer instructions for capturing a multi-spectral image of the plants from a position above the plant so as to differentiate the plant from a plurality of surrounding materials; and a fourth set of computer instructions for adding the multi-spectral image to the plant characteristic data set.

37. A computer program product according to claim 32, wherein said sensor assembly further comprises a locator device in communication with said computer device; the method further comprising:

a third set of computer instructions for transmitting a location data set from said locator device to said computer device to determine a location of the plant; and a fourth set of computer instructions for adding the location data set to the plant characteristic data set.

38. A computer program product according to claim 33, wherein said sensor assembly is carried by a movable assembly having at least one axle and wherein said sensor assembly further comprises a shaft encoder operably engaged with said axle and in communication with said computer device, the computer program product further comprising:

a sixth set of computer instructions for transmitting a location data set from said shaft encoder to said computer device to determine a distance along the row of plants; and a seventh set of computer instructions for adding the location data set to the plant characteristic data set.

39. A computer program product according to claim 32, wherein said sensor assembly further comprises a global positioning system device, the computer program product further comprising:

a third set of computer instructions for determining a position of the plant using a global positioning system; and a fourth set of computer instructions for adding the determined position of the plant to the plant characteristic data set.

40. A computer program product according to claim 32, wherein said computer device further comprises a memory device, the computer program product further comprising a third set of computer instructions for storing the plant characteristic data set of a known plant of interest in the memory device.

41. A computer program product according to claim 40, further comprising a fourth set of computer instructions for identifying the plant by comparing the generated plant characteristic data set with the stored plant characteristic data set of the known plant of interest.

42. A computer program product according to claim 32, further comprising:

a third set of computer instructions for counting of a number of a plurality of plants for which a corresponding plurality of plant characteristic data sets are generated; and a fourth set of computer instructions for storing the counted number of the plurality of plants.

43. A computer program product according to claim 42, further comprising a fifth set of computer instructions for determining the number of the plurality of plants located in at least one physical unit based at least in part on the corresponding plurality of plant characteristic data sets.

44. A computer program product according to claim 43, wherein the at least one physical unit is selected from the group consisting of:

a row;

an agricultural plot; and combinations thereof.

* * * * *